US008432968B2

(12) United States Patent
Ye et al.

(10) Patent No.: US 8,432,968 B2
(45) Date of Patent: Apr. 30, 2013

(54) SCALABLE VIDEO CODING TECHNIQUES FOR SCALABLE BITDEPTHS

(75) Inventors: Yan Ye, San Diego, CA (US); Hyukjune Chung, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 835 days.

(21) Appl. No.: 12/251,174

(22) Filed: Oct. 14, 2008

(65) Prior Publication Data

US 2009/0097558 A1 Apr. 16, 2009

Related U.S. Application Data

(60) Provisional application No. 60/979,921, filed on Oct. 15, 2007.

(51) Int. Cl.
H04N 11/02 (2006.01)
(52) U.S. Cl.
USPC ............. 375/240.12; 375/240.13; 375/240.16
(58) Field of Classification Search .................. 375/240, 375/240.01, 240.12, 240.16, 240.13, 240.24
See application file for complete search history.

(56) References Cited

U.S. PATENT DOCUMENTS

| | | | | |
|---|---|---|---|---|
| 7,535,383 | B2 * | 5/2009 | Segall et al. ..................... | 341/50 |
| 7,894,523 | B2 * | 2/2011 | Jeon et al. ................. | 375/240.12 |
| 7,929,610 | B2 * | 4/2011 | Sun .......................... | 375/240.16 |
| 2006/0233254 | A1 | 10/2006 | Lee et al. | |

FOREIGN PATENT DOCUMENTS

| | | |
|---|---|---|
| EP | 1715693 A2 | 10/2006 |
| EP | 1871113 A1 | 12/2007 |
| JP | 2006304307 A | 11/2006 |
| KR | 20060110714 A | 10/2006 |
| WO | WO2006042611 | 4/2006 |
| WO | WO2006112642 A1 | 10/2006 |
| WO | WO2007114617 | 10/2007 |

OTHER PUBLICATIONS

International Search Report & Written Opinion—PCT/US2009/080030, International Search Authority—European Patent Office—Feb. 23, 2009.
Martin Winken et al: "Bit-Depth Scalable Video Coding" Image Processing, 2007. ICIP 2007. IEEE International Conference on, IEEE, PI, Sep. 1, 2007, pp. 1-5, XP031157664 ISBN: 978-1-4244-1436-9 Section 2. Description of the approach figure 1.

(Continued)

Primary Examiner — Hosuk Song
(74) Attorney, Agent, or Firm — Brent A. Boyd

(57) ABSTRACT

This disclosure describes video coding techniques that are executed in a bitdepth-based scalable video coding (SVC) scheme. Base layer video data and enhancement layer video data may be defined at different bitdepths. The techniques of this disclosure concern the coding of enhancement layer video blocks using a unique combination of inter-layer predictive coding modes after determining that inter-layer prediction should be used. In particular, two or more different inter-layer predictive coding modes may be utilized block corresponding to inter base layer blocks, and one of these inter-layer predictive coding modes may also be utilized for blocks corresponding to intra base layer blocks. Syntax information can be generated at the encoder and communicated with the bitstream, so that a decoder can use the proper inter-layer predictive coding mode in the decoding.

42 Claims, 6 Drawing Sheets

OTHER PUBLICATIONS

Ye Y et al: "Prop SVC bit depth scalability" 25. JVT Meeting; 82. MPEG Meeting; Oct. 21, 2007-Oct. 26, 2007; Shenzhen, CN; (Joint Video Team of ISO/IEC JTC1/SC29/WG11 and ITU-T SG.16 ),, No. JVT-Y048, Oct. 21, 2007, XP030007253 JVT input document by applicant of present application, published after priority date.

Yuwen Wu et al: "Bit Depth Scalable Coding" Multimedia and Expo, 2007 IEEE International Conference on, IEEE, PI, Jul. 1, 2007, pp. 1139-1142, XP031123831 ISBN: 978-1-4244-1016-3p. 1139, left-hand column, line 9-p. 1140, left-hand column, last line.

Yongying Gao, et al., "Simulation Results for CE2: SVC Bit-depth Scalability", Joint Video Team (JVT) of ISO/IEC MPEG & ITU-T VCEG (ISO/IEC JTC1/SC29/WG11 and ITU-T SG16 Q.6), JVT-X051. Jun.-Jul. 5, 2007, Ch.29, 24th Meeting: Geneva.

Martin Winken et al., "CE2: SVC bit-depth scalable coding", Joint Video Team (JVT) of ISO/IEC MPEG & ITU-T VCEG (ISO/IEC JTC1/SC29/WG11 and ITU-T SG16 Q.6), JVT-X057. Jun.-Jul. 5, 2007. CH.29, 24th Meeting: Geneva.

* cited by examiner

SCALABLE VIDEO CODING TECHNIQUES FOR SCALABLE BITDEPTHS

This application claims the benefit of U.S. Provisional Application No. 60/979,921, filed on Oct. 15, 2007, the entire content of which is incorporated herein by reference,

TECHNICAL FIELD

This disclosure relates to digital video coding and, more particularly, scalable video coding (SVC) in which a base layer and an enhancement layer define different bitdepths of video data.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement block-based video compression techniques, such as those defined in MPEG-2, MPEG-4, or H.264/MPEG-4, Part 10, Advanced Video Coding (AVC), to transmit and receive digital video in an efficient manner.

Block-based coding techniques generally perform spatial prediction and/or temporal prediction in order to achieve data compression in video sequences. Intra-coding relies on spatial prediction to reduce or remove spatial redundancy between video blocks within a given coded unit, which may comprise a video frame, a slice of a video frame, or another independently decodable unit of data. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process. A 16 by 16 area of pixels is typically represented by sub-partitioned luminance (luma) blocks and two different downsampled 8 by 8 chrominance (chroma) blocks. Each of the different video blocks may be predictively coded.

After block-based prediction coding, the video encoder may apply transform, quantization and entropy coding processes to further reduce the bit rate associated with communication of a residual block. Transform techniques may comprise discrete cosine transforms or conceptually similar processes, such as wavelet transforms, integer transforms, or other types of transforms. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients, such as context adaptive variable length coding (CAVLC) or context adaptive binary arithmetic coding (CABAC).

Some block-based video coding and compression makes use of scalable techniques. Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. In some cases, the base layer may be transmitted in a manner that is more reliable than the transmission of enhancement layers.

Some types of SVC schemes are scalable based on bitdepths of pixel values. In these cases, the base layer may define pixel values at a base level of quality according to a first bitdepth, and the enhancement layer may add additional data such that the base and enhancement layers together define pixel values at a higher level of quality, e.g., according to a second bitdepth that is larger than the first bitdepth. Bitdepth scalability is becoming more and more desirable due to the emergence of higher resolution display capabilities, which support pixel reproduction based on higher bitdepths than conventional displays.

SUMMARY

In general, this disclosure describes video encoding and video decoding techniques that are executed in a bitdepth-based scalable video coding (SVC) scheme. The term "coding" is used in this disclosure to generally refer to either encoding or decoding. In accordance with this disclosure, base layer video data and enhancement layer video data are defined at different bitdepths. The base layer video data may have a bitdepth of M bits, and the enhancement layer video data may provide enhancements to a bitdepth of N bits, wherein N is greater than M. As an example, the base layer bitdepth may be 8 bits and the enhancement layer may provide enhancements to 10 bits.

The techniques of this disclosure concern the coding of enhancement layer video blocks following a determination that an N-bit enhancement layer video block should be coded based on the base layer using inter-layer prediction. In this case, two or more different inter-layer predictive coding modes may be utilized for inter base layer blocks, and one of these inter-layer predictive coding modes may also be utilized for intra blocks. Syntax information can be generated at the encoder and communicated with the bitstream, so that a decoder can use the inter-layer predictive coding mode in the decoding.

In one example, this disclosure describes a method of encoding video data according to a bitdepth-based SVC scheme. The method comprises generating a base layer and an enhancement layer associated with the video data, wherein the base layer defines the video data with bitdepths of M bits and the enhancement layer defines an enhancement of the bitdepths to N bits, wherein N is larger than M. The method also comprises encoding the base layer and the enhancement layer. Encoding the enhancement layer includes determining whether an N-bit enhancement layer video block should be coded based on the base layer using inter-layer prediction, and upon determining that the N-bit enhancement layer video block should be coded based on the base layer using interlayer prediction, determining whether the N-bit enhancement layer video block corresponds to an intra base layer block or an inter base layer block. If the N-bit enhancement layer video block corresponds to an intra base layer block, the method includes coding the N-bit enhancement layer video block according to a first inter-layer predictive coding technique, wherein the first inter-layer predictive coding technique includes generating a residual video block as a difference between the N-bit enhancement layer video block and an upsampled N-bit version of a corresponding reconstructed M-bit base layer video block. If the N-bit enhancement layer video block corresponds to an inter base layer block, the method includes selecting between the first inter-layer predictive coding technique and a second inter-layer predictive coding technique, wherein the second inter-layer predictive coding technique includes generating the residual video block as a difference between the N-bit enhancement layer video block and an N-bit prediction block that is identified by a motion vector associated with a corresponding M-bit base layer video block.

In another example, this disclosure describes a method of decoding video data according to a bitdepth-based SVC scheme. The decoding method comprises receiving a base layer and an enhancement layer associated with the video data, wherein the base layer defines the video data with bitdepths of M bits and the enhancement layer defines an enhancement of the bitdepths to N bits, wherein N is larger than M. The method also comprises decoding the base layer and the enhancement layer. Decoding the enhancement layer includes determining whether an N-bit enhancement layer video block was coded based on the base layer using inter-layer prediction, and upon determining that the N-bit enhancement layer video block was coded based on the base layer using inter-layer prediction, determining whether the N-bit residual enhancement layer video block corresponds to an intra base layer block or an inter base layer block. If the N-bit residual enhancement layer video block corresponds to an intra base layer block, the method includes decoding the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block. If the N-bit residual enhancement layer video block corresponds to an inter base layer block, the method includes selecting between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

In another example, this disclosure describes an apparatus that encodes video data according to a bitdepth-based SVC scheme. The apparatus comprises a bitdepth-based scalable video encoder that generates a base layer and an enhancement layer associated with the video data, wherein the base layer defines the video data with bitdepths of M bits and the enhancement layer defines an enhancement of the bitdepths to N bits, wherein N is larger than M. The video encoder encodes the base layer and the enhancement layer, wherein for the enhancement layer, the video encoder determines whether an N-bit enhancement layer video block should be coded based on the base layer using inter-layer prediction, and upon determining that the N-bit enhancement layer video block should be coded based on the base layer using inter-layer prediction, the video encoder determines whether an N-bit enhancement layer video block corresponds to an intra base layer block or an inter base layer block. If the N-bit enhancement layer video block corresponds to an intra base layer block, the video encoder encodes the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block. If the N-bit enhancement layer video block corresponds to an inter base layer block, the video encoder selects between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block.

In another example, this disclosure describes an apparatus that decodes video data according to a bitdepth-based SVC scheme. In this case, the apparatus comprises a bitdepth-based scalable video decoder that receives a base layer and an enhancement layer associated with the video data, wherein the base layer defines the video data with bitdepths of M bits and the enhancement layer defines an enhancement of the bitdepths to N bits, wherein N is larger than M. The video decoder decodes the base layer and the enhancement layer, wherein for the enhancement layer, wherein the video decoder determines whether an N-bit enhancement layer video block was coded based on the base layer using inter-layer prediction, and upon determining that the N-bit enhancement layer video block was coded based on the base layer using inter-layer prediction, the video decoder determines whether an N-bit residual enhancement layer video block corresponds to an intra base layer block or an inter base layer block. If the N-bit residual enhancement layer video block corresponds to an intra base layer block, the video decoder decodes the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block. If the N-bit residual enhancement layer video block corresponds to an inter base layer block, the video decoder selects between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

In another example, this disclosure describes a device that encodes video data according to a bitdepth-based SVC scheme. The device comprises means for generating a base layer and an enhancement layer associated with the video data, wherein the base layer defines the video data with bitdepths of M bits and the enhancement layer defines an enhancement of the bitdepths to N bits, wherein N is larger than M. The device also comprises means for encoding the base layer, and means for encoding the enhancement layer, wherein means for encoding the enhancement layer includes means for determining whether an N-bit enhancement layer video block should be coded based on the base layer using inter-layer prediction, and upon determining that the N-bit enhancement layer video block should be coded based on the base layer using inter-layer prediction, means for determining whether an N-bit enhancement layer video block corresponds to an intra base layer block or an inter base layer block. If the N-bit enhancement layer video block corresponds to an intra base layer block, the device invokes means for encoding the N-bit enhancement layer video block according to a first inter-layer predictive coding technique, wherein the first inter-layer predictive coding technique includes generating a residual video block as a difference between the N-bit enhancement layer video block and an upsampled N-bit version of a corresponding reconstructed M-bit base layer video block. If the N-bit enhancement layer video block corresponds to an inter base layer block, the device invokes means for selecting between the first inter-layer predictive coding technique and a second inter-layer predictive coding technique, wherein the second inter-layer predictive coding technique includes generating the residual video block as a difference between the N-bit enhancement layer video block and an N-bit prediction block that is identified by a motion vector associated with a corresponding M-bit base layer video block.

In another example, this disclosure describes a device that decodes video data according to a bitdepth-based SVC scheme. The device comprises means for receiving a base layer and an enhancement layer associated with the video data, wherein the base layer defines the video data with bitdepths of M bits and the enhancement layer defines an enhancement of the bitdepths to N bits, wherein N is larger than M. The devices also comprises means for decoding the base layer, means for decoding the enhancement layer, wherein means for decoding the enhancement layer includes means for determining whether an N-bit enhancement layer video block was coded based on the base layer using inter-layer prediction, and upon determining that the N-bit enhancement layer video block was coded based on the base layer using inter-layer prediction, means for determining whether an N-bit residual enhancement layer video block corresponds to an intra base layer block or an inter base layer block. If the N-bit residual enhancement layer video block corresponds to an intra base layer block, the device comprises means for decoding the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block. If the N-bit residual enhancement layer video block corresponds to an inter base layer block, the device comprises means for selecting between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

In another example, this disclosure describes a device that encodes video data according to a bitdepth-based SVC scheme. The device comprises a bitdepth-based scalable video encoder that generates a base layer and an enhancement layer associated with the video data, wherein the base layer defines the video data with bitdepths of M bits and the enhancement layer defines an enhancement of the bitdepths to N bits, wherein N is larger than M, and encodes the base layer and the enhancement layer. For the enhancement layer the video encoder determines whether an N-bit enhancement layer video block should be coded based on the base layer using inter-layer prediction, and upon determining that the N-bit enhancement layer video block should be coded based on the base layer using inter-layer prediction, determines whether an N-bit enhancement layer video block corresponds to an intra base layer block or an inter base layer block. If the N-bit enhancement layer video block corresponds to an intra base layer block, the video encoder encodes the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block. If the N-bit enhancement layer video block corresponds to an inter base layer block, the video encoder selects between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block. In this example, the device also includes a wireless transmitter that transmits the base layer and the enhancement layer to another device.

In another example, this disclosure describes a device that decodes video data according to a bitdepth-based SVC scheme. The device comprises a wireless receiver that receives the video data, and a bitdepth-based scalable video decoder that receives a base layer and an enhancement layer associated with the video data, wherein the base layer defines the video data with bitdepths of M bits and the enhancement layer defines an enhancement of the bitdepths to N bits, wherein N is larger than M. The video decoder decodes the base layer and the enhancement layer, wherein for the enhancement layer, the video decoder determines whether an N-bit enhancement layer video block was coded based on the base layer using inter-layer prediction, and upon determining that the N-bit enhancement layer video block was coded based on the base layer using inter-layer prediction, determines whether an N-bit residual enhancement layer video block corresponds to an intra base layer block or an inter base layer block. If the N-bit residual enhancement layer video block corresponds to an intra base layer block, the video decoder decodes the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block. If the N-bit residual enhancement layer video block corresponds to an inter base layer block, the video decoder selects between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

The techniques described in this disclosure may be implemented in hardware, software, firmware, or any combination thereof If implemented in software, the software may be executed in one or more processors, such as a microprocessor, application specific integrated circuit (ASIC), field programmable gate array (FPGA), or digital signal processor (DSP).

The software that executes the techniques may be initially stored in a computer-readable medium and loaded and executed in the processor. In some cases, the software may also be sold in a computer program product, which includes the computer-readable medium and packaging materials for the computer-readable medium Accordingly, in another example, this disclosure describes a computer-readable medium comprising instructions that upon execution cause a video coding device to encode video data according to a bitdepth-based SVC scheme, wherein the instructions cause the device to generate a base layer and an enhancement layer associated with the video data, wherein the base layer defines the video data with bitdepths of M bits and the enhancement layer defines an enhancement of the bitdepths to N bits, wherein N is larger than M. The instructions also cause the device to encode the base layer and the enhancement layer, wherein for the enhancement layer, the instructions cause the device to determine whether an N-bit enhancement layer video block should be coded based on the base layer using inter-layer prediction, and upon determining that the N-bit enhancement layer video block should be coded based on the base layer using inter-layer prediction, determine whether an N-bit enhancement layer video block corresponds to an intra base layer block or an inter base layer block. If the N-bit enhancement layer video block corresponds to an intra base layer block, the instructions cause the device to encode the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block. If the N-bit enhancement layer video block corresponds to an inter base layer block, the instructions cause the device to select between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block.

In yet another example, this disclosure describes a computer-readable medium comprising instructions that upon execution cause a video coding device to decode video data according to a bitdepth-based SVC scheme. Upon receiving a base layer and an enhancement layer associated with the video data, wherein the base layer defines the video data with bitdepths of M bits and the enhancement layer defines an enhancement of the bitdepths to N bits, wherein N is larger than M, the instructions cause the device to decode the base layer and the enhancement layer, wherein for the enhancement layer, the instructions cause the device to determine whether an N-bit enhancement layer video block was coded based on the base layer using inter-layer prediction, and upon determining that the N-bit enhancement layer video block was coded based on the base layer using inter-layer prediction, determine whether an N-bit residual enhancement layer video block corresponds to an intra base layer block or an inter base layer block. If the N-bit residual enhancement layer video block corresponds to an intra base layer block, the instructions cause the device to decode the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block. If the N-bit residual enhancement layer video block corresponds to an inter base layer block, the instructions cause the device to: select between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

In other cases, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
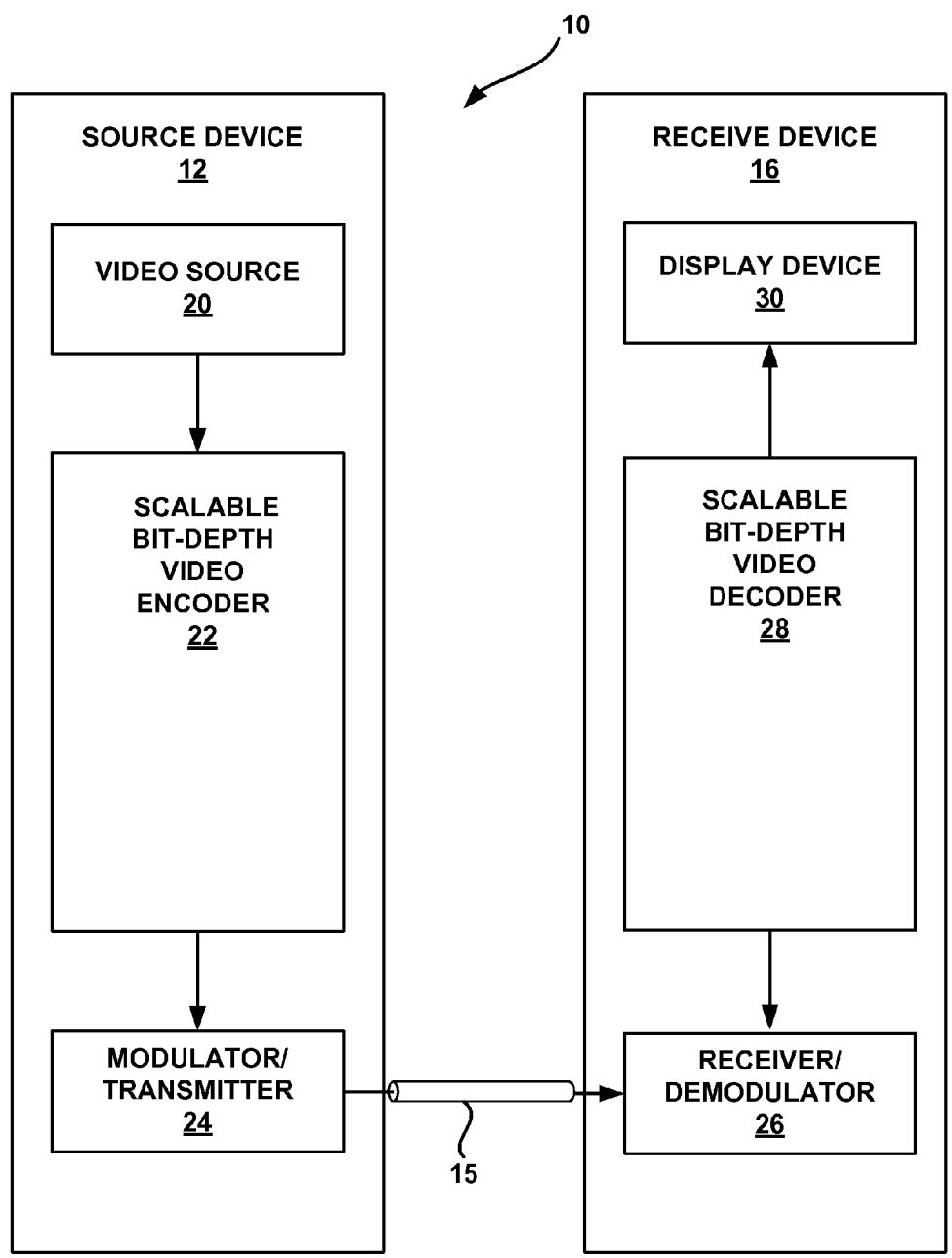
FIG. 1 is an exemplary block diagram illustrating a video encoding and decoding system that may implement one or more of the techniques of this disclosure.

In general, this disclosure describes video encoding and video decoding techniques that are executed in a bitdepth-based scalable video coding (SVC) scheme. The term "coding" is used to generally refer to either encoding or decoding. In accordance with this disclosure, base layer video data and enhancement layer video data is defined at different bitdepths. The base layer video data may have a bitdepth of M bits, and the enhancement layer video data may provide enhancements to N bits, wherein N is greater than M.

As an example, the base layer bitdepth may be 8 bits and the enhancement layer may provide enhancements to 10 bits, although the techniques of this disclosure may apply to any bitdepths as long as the enhancement layer corresponds to a larger bitdepth than the base layer. In this example, pixel values (e.g., chroma and luma values in the pixel domain) may be represented by 10 bits in the enhancement layer and by 8 bits in the base layer. 8 bit representations may allow for 256 different pixel values, while 10 bits may allow for 1024 different pixel values. Again, bitdepth values of 10 and 8 for N and M are merely examples. Generally, N and M represent positive integers, wherein N is greater than M.

The techniques of this disclosure concern the coding of enhancement layer video blocks. In particular, the techniques of this disclosure specifically apply once the encoder determines that an enhancement layer video block should be coded based on the base layer using inter-layer prediction, or once the decoder determines that an enhancement layer video block was coded based on the base layer using inter-layer prediction. In these cases, two or more different inter-layer predictive coding modes may be utilized for predicting inter base layer blocks, and one of these predictive coding modes may also be utilized for predicting intra base layer blocks. Syntax information can be generated at the encoder and communicated with the bitstream, so that a decoder can use the inter-layer predictive coding mode in the decoding. In particular, first syntax information may be used to convey whether an enhancement layer video block is coded based on the base layer using inter-layer prediction, and second syntax information may be used to specify the inter-layer predictive coding mode used in this case.

For "intra" enhancement layer video blocks (e.g., enhancement layer blocks for which the corresponding base layer blocks are intra-coded based on spatial coding techniques), this disclosure uses a first inter-layer predictive coding technique in which a residual video block is generated as a difference between the N-bit enhancement layer video block and an upsampled N-bit version of a corresponding reconstructed M-bit base layer video block. This type of prediction can be very effective for enhancement layer video blocks that correspond to intra base layer blocks.

On the other hand, for enhancement layer video blocks that correspond to inter base layer blocks (e.g., enhancement layer blocks for which the corresponding base layer blocks are inter-coded based on temporal coding techniques such as motion estimation and motion compensation), this disclosure selects between two different inter-layer predictive coding techniques. In this case, the first inter-layer predictive coding technique is the same as that used for intra blocks, i.e., a residual video block is generated as a difference between the N-bit enhancement layer video block and an upsampled N-bit version of a corresponding reconstructed M-bit base layer video block. The second inter-layer predictive coding technique includes generation of the residual video block as a difference between the N-bit enhancement layer video block and an N-bit prediction block that is identified by a motion vector associated with a corresponding M-bit base layer video block. The ability to select between theses two different predictive coding techniques for enhancement layer video blocks that correspond to inter base layer blocks can be very effective in achieving desirable compression and video quality.

At the encoder, the techniques may be applied for different video block types (intra or inter), and selection between the two different predictive coding techniques for inter base layer blocks may occur based on the predictive coding technique that provides the best level of data compression and/or the best video quality. Often rate and distortion may be balanced in making this selection. Syntax information is coded in the bitstream so that the decoder is properly informed of the predictive encoding technique that was applied at the encoder. Then, at the decoder, the video block type (intra or inter) and the syntax information may be used so that the decoder will apply the correct predictive encoding technique. In particular, at the decoder, the selection between the two different inter-layer predictive coding techniques for inter base layer blocks may occur based on the syntax information that is sent in the bitstream. At the decoder, the different predictive coding techniques are used to reconstruct the N-bit enhancement layer video blocks by adding to the N-bit enhancement layer prediction video blocks the N-bit enhancement layer residual video blocks that are transmitted from the encoder device to the decoder device.

As outlined in greater detail below, syntax information used in accordance with this disclosure may comprise first syntax information and second syntax information. The first syntax information may be used to convey whether an enhancement layer video block is coded based on the base layer using inter-layer prediction, and may comprise one bit per video block. This first syntax information may be a basic prerequisite to the techniques described herein insofar as the coding different coding modes described herein may apply only when the enhancement layer video block is coded based on the base layer.

The second syntax information may comprise one bit that is sent when the first syntax information identifies that the enhancement layer video block is coded based on the base layer video block using inter-layer prediction, and when the corresponding base layer video block is an inter block to define whether that enhancement layer video block was predictively coded using the first or the second inter-layer predictive coding technique. Alternatively, the second syntax information may comprise one bit of syntax sent with each video block that was coded based on an inter base layer block or an intra base layer block when the first syntax information identifies that the enhancement layer video block is coded based on the base layer video block using inter-layer prediction. The later case may add an additional bit for which the base layer blocks are intra coded, which may be unnecessary to achieve decompression. However, by sending this additional bit for blocks coded based on intra base layer blocks (as well as block coded base on inter base layer blocks), the video decoder may be able to perform parallel entropy coding of the base and enhancement layers, which is often desirable to accelerate the decoding process.

FIG. 1 is a block diagram illustrating a video encoding and decoding system 10. As shown in FIG. 1, system 10 includes a source device 12 that transmits encoded video to a destination device 16 via a communication channel 15. Source device 12 may implement the techniques of this disclosure as part of a video encoding process, whereas destination device 16 may implement the techniques of this disclosure as part of a video decoding process.

Source device 12 may include a video source 20, video encoder 22 and a modulator/transmitter 24. Destination device 16 may include a receiver/demodulator 26, video decoder 28, and display device 30. System 10 may be configured to apply a bitdepth-based scalable video coding (SVC) scheme.

SVC refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. One example of SVC is bitdepth-based SVC. In bitdepth-based SVC, the base layer may define pixel values at a base level of quality according to a first bitdepth, and the enhancement layer may add additional data such that the base and enhancement layers together define pixel values at a higher level of quality, e.g., according to a second bitdepth that is larger than the first bitdepth. Bitdepth scalability is becoming more and more desirable, particularly due to the emergence of higher resolution display capabilities, which support pixel reproduction based on higher bitdepths than most conventional displays.

In accordance with this disclosure, devices 12 and 16 perform inter-layer predictive coding techniques with respect to enhancement layer video blocks in which enhancement layer video blocks that correspond to base layer intra blocks are coded in a specific way according to a first inter-layer predictive coding technique. In addition, enhancement layer video blocks that correspond to base layer inter blocks are coded based on either the first inter-layer predictive coding technique or a second inter-layer predictive coding technique. The unique combination of video coding techniques described herein for enhancement layer blocks that correspond to intra base layer blocks and inter blocks may provide improvements in video compression and/or video quality. Again, this unique combination may specifically apply once it has been determined that the enhancement layer blocks are coded based on the base layer blocks.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. The techniques of this disclosure are not limited to any types of communication between devices 12 and 16, and may apply to wireless or wire-based settings. Scalable techniques, however, are often associated with wireless communication.

Source device 12 generates coded video data for transmission to destination device 16. In some cases, however, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video and computer-generated video. In some cases, if video source 20 is a video camera, source device 12 and destination device 16 may form so-called camera phones or video phones. In each case, the captured, pre-captured or computer-generated video may be encoded by video encoder 22 for transmission from video source device 12 to video decoder 28 of video destination device 16 via modulator/transmitter 22, communication channel 15 and receiver/demodulator 26. Display device 30 displays the decoded video data to a user, and may comprise any of a variety of display devices such as a cathode ray tube, a liquid crystal display (LCD), a plasma display, an organic light emitting diode (OLED) display, or another type of display device.

Video encoder 22 and video decoder 28 may be configured to support SVC for bitdepth-based scalability. In particular, encoder 22 and decoder 28 may support various degrees of scalability by supporting encoding, transmission and decoding of a base layer and one or more scalable enhancement layers. Again, for bit-depth based SVC, a base layer carries video data with a base level of quality according to a first bitdepth M. One or more enhancement layers carry additional data to support higher level of quality according to a second bitdepth N, wherein N is larger than M. In some cases, the base layer may be transmitted in a manner that is more reliable than the transmission of enhancement layers. For example, the most reliable portions of a modulated signal may be used to transmit the base layer, while less reliable portions of the modulated signal may be used to transmit the enhancement layers. In other cases, base and enhancement layer information may be transmitted in any way, and a receiving device may choose to decode the base layer only, or the base layer and the enhancement layer for improved quality due to increased bitdepth of reconstructed pixel values.

In order to support SVC, video encoder 22 may comprise a scalable bitdepth video coder designed to perform encoding of a base layer and one or more enhancement layers, respectively. Similarly, video decoder 28 may comprise a scalable bitdepth video decoder that decodes the video blocks associated with both base and enhancement layers. Video decoder 28 may decode the video blocks associated with both base and enhancement layers, and combine the decoded video to reconstruct the frames of a video sequence. Display device 30 receives the decoded video sequence, and presents the video sequence to a user.

Video encoder 22 and video decoder 28 may operate according to a video compression standard, such as MPEG-2, MPEG-4, ITU-T H.263, or ITU-T H.264/MPEG-4, Part 10, Advanced Video Coding (AVC). Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 Part 10 AVC standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard, or extensions thereof. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The Joint Video Team (JVT) continues to work on SVC extensions to H.264/MPEG-4 AVC. The specification of the evolving SVC extension is often released in the form of a Joint Draft (JD). The Joint Scalable Video Model (JSVM) created by the JVT implements tools for use in scalable video, which may be used within system 10 for various coding tasks described in this disclosure.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 12 may be a mobile wireless terminal, a video streaming server, or a video broadcast server. However, as noted above, techniques described in this disclosure are not limited to any particular type of broadcast, multicast, or point-to-point system. In the case of broadcast, source device 12 may broadcast several channels of video data to multiple destination devices, each of which may be similar to destination device 16 of FIG. 1.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In addition, source device 12 and destination device 16 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 24 of source device 12 and receiver/demodulator 26 of destination device 16 in FIG. 1.

A video sequence includes a series of video frames, which may be further divided into slices or other coded units. Video encoder 22 operates on video blocks within individual video frames (or on video blocks within slices or other coded units) in order to encode the video data. The video blocks may comprise luma and chroma blocks, and may have fixed or varying sizes, e.g., as defined according to any coding standard. Again, in some cases, each video frame may include a series of slices. Moreover, each slice may include a series of macroblocks, which may be arranged into sub-blocks. As an example, the ITU-T H.264 standard supports intra prediction in various block sizes, such as 16 by 16, 8 by 8, or 4 by 4 block sizes for luma components, and intra prediction in 8 by 8 block sizes for chroma components, as well as inter prediction in various block sizes, such as 16 by 16, 16 by 8, 8 by 16, 8 by 8, 8 by 4, 4 by 8 and 4 by 4 for luma components and corresponding block sizes for chroma components. If the video sequence is in YUV4:2:0 format, then the corresponding inter prediction block sizes for chroma components are the corresponding luma block sizes downsampled by a factor of 2 in each of horizontal and vertical dimensions. Video blocks may comprise blocks of pixel data, or blocks of transformation coefficients, e.g., following a transformation process such as discrete cosine transform (DCT).

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit of a video frame. After prediction, a transform may be performed on the 8×8 residual block or 4×4 residual block, and an additional transform may be applied to the DC coefficients of the 4×4 blocks for chroma components or luma component if an intra_16×16 prediction mode is used. Again, following the transformation, the data may still be referred to as being video blocks, i.e., blocks of transformation coefficients. Following intra- or inter-based predictive coding and transformation techniques (such as the 4×4 or 8×8 DCT-like integer transform used in H.264/AVC, or another form of DCT) and quantization techniques (such as scalar quantization), run-length coding may be performed.

According to the techniques of this disclosure, enhancement layer video blocks are predictively coded according to a methodology that applies a first inter-layer predictive coding technique to video blocks that correspond to intra base layer blocks, and selects between the first inter-layer predictive coding technique and a second inter-layer predictive coding technique for video blocks that correspond to inter base layer blocks. These different prediction paths specifically apply once it has been determined that the enhancement layer video blocks are coded based on the base layer blocks. Notably, at the encoder, the first inter-layer predictive coding technique involves the generation of an N-bit predictive block based on a corresponding reconstructed M-bit base layer block. The second inter-layer predictive coding technique essentially borrows the motion information of the base layer block, and generates a predictive enhancement layer block based on video data in the N-bit domain using the motion information of the base layer block, which corresponds to the M-bit domain. The value of N is larger than M such that N bits is the bitdepth of the enhancement layer data and M bits is the bitdepth of the base layer data. At the decoder, similar predictive coding technique are used to reconstruct the original video blocks based on N-bit residual enhancement layer video blocks that are communicated to the decoder from the encoder, and syntax information may help the decoder identify which predictive coding technique to use for different video blocks.

Figure 2:
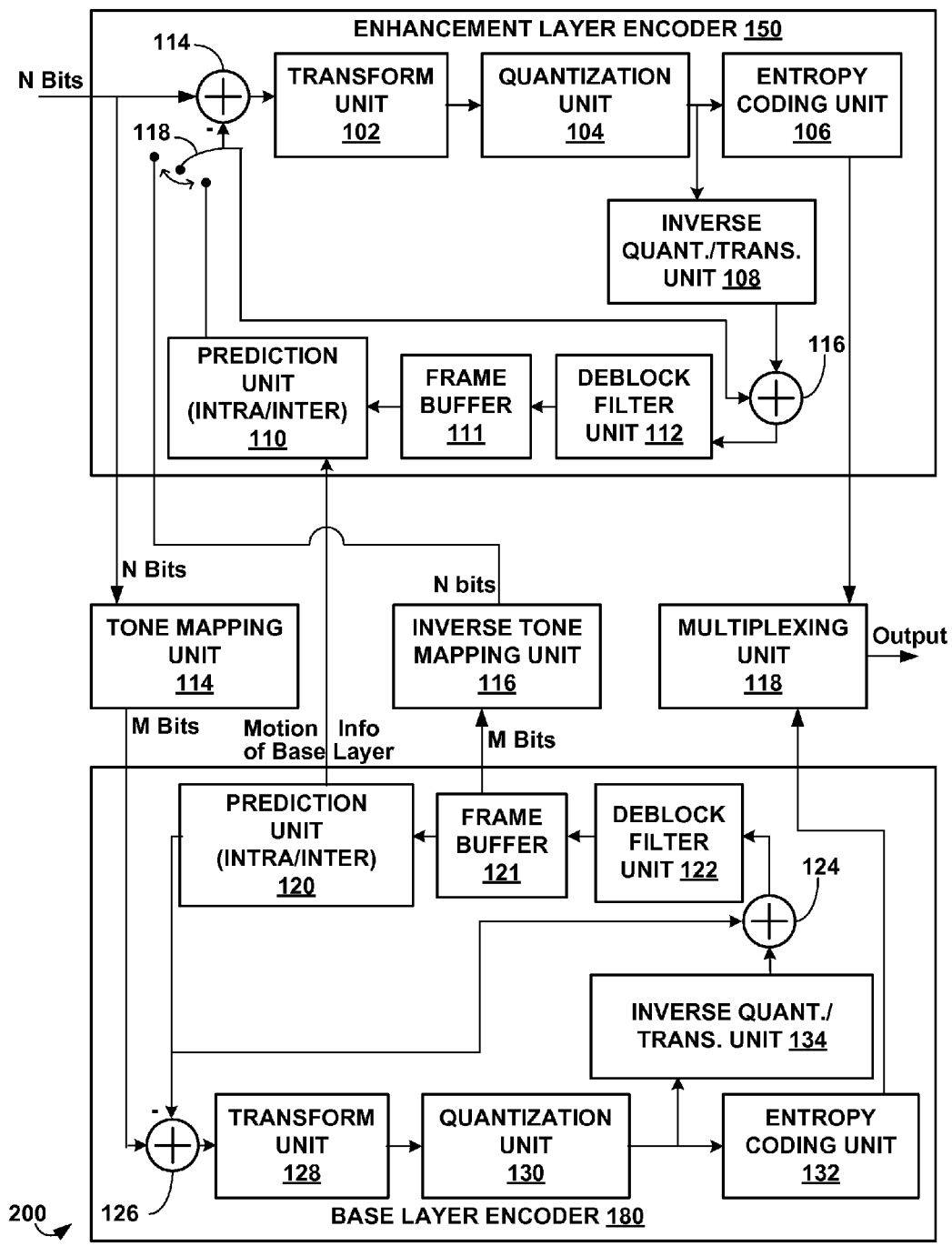
FIG. 2 is a block diagram illustrating an exemplary video encoder consistent with this disclosure.

FIG. 2 is a block diagram illustrating another depiction of an exemplary scalable video encoder 200 consistent with this disclosure. Scalable video encoder 200 may correspond to scalable bit-depth video encoder 22 of FIG. 1. Scalable video encoder 200 comprises a base layer encoder 180 and an enhancement layer encoder 150. Although illustrated separately, in some implementations, various units of base layer encoder 180 and enhancement layer encoder 150 may be shared or combined. Base layer encoder 180 encodes base layer video blocks, whereas enhancement layer encoder 150 encodes enhancement layer video blocks. On the encoding side, the techniques of this disclosure generally concern the encoding of enhancement layer video blocks by enhancement layer encoder 150.

Enhancement layer encoder 150 may comprise an adder 114 that subtracts predictive video blocks from incoming N-bit enhancement layer video blocks to generate residual video blocks. A switch 118 defines the prediction path within encoder 150, as outlined in greater detail below. Enhancement layer encoder 150 includes a transform unit 102 and a quantization unit to transform and quantize the residual video blocks. In addition, enhancement layer encoder 150 may include unit 108, which represents both an inverse quantization unit and an inverse transform unit. Entropy coding unit 106 entropy codes the residual blocks along with any syntax information, such as motion vectors, intra prediction syntax, or the information defined herein for identifying the prediction techniques that are used. Adder 116 reconstructs the video blocks based on residual blocks from unit 108 and the predictive blocks used to code such residual blocks. Deblock filter unit 112 may filter the reconstructed data, which is then forwarded to frame buffer 111 for use by prediction unit 110 in intra- or inter-prediction, as described herein.

Base layer encoder 180 may comprise various units, including a prediction unit 120 for use in intra- or inter-prediction of base layer video blocks. An adder 126 subtracts predictive video blocks from incoming M-bit base layer video blocks to generate residual video blocks. Transform unit 128 performs transforms such as DCT, and quantization unit 130 performs quantization. Unit 134 represents both an inverse quantization unit and an inverse transform unit. Entropy coding unit 132 entropy codes the residual blocks along with any syntax information, such as motion vectors or intra prediction syntax for base layer video blocks. Adder 124 reconstructs the video blocks based on reconstructed residual blocks from unit 134 and the predictive blocks used to code such residual blocks. Deblock filter unit 122 may filter the reconstructed data, which is then forwarded to frame buffer 121 for use by prediction unit 120 in subsequent intra- or inter- prediction of base layer data.

Scalable video encoder 200 also comprises a tone mapping unit 114 that downsamples N-bit samples from enhancement layer encoder 150 to M-bit samples for base layer encoder 180. In addition, scalable video encoder 200 comprises an inverse tone mapping unit 116 that upsamples M-bit samples from base layer encoder 180 to N-bit samples for enhancement layer encoder 150. A multiplexing unit 118 may combine the enhancement layer bitstream that carries information for reconstruction of the N-bit output samples from enhancement layer encoder 150 with the base layer bitstream that carries information for reconstruction of the M-bit output samples from base layer encoder 180 in order to generate a scaled output stream of coded digital video data.

Enhancement layer encoder 150 may perform one or more prediction techniques that rely on the corresponding base layer data, e.g., the same spatially and temporally located coded unit of the base layer, in order to code an enhancement layer video block. According to this disclosure, bitdepth-based scalable video encoding is applied by enhancement layer encoder 150 and base layer encoder 180. Base layer encoder 180 generates the base layer, whereas enhancement layer encoder 150 generates the enhancement layer. The base layer defines video data with bitdepths of M bits, and the enhancement layer defines an enhancement of the video data to bitdepths of N bits, wherein N is larger than M.

The techniques of this disclosure specifically apply with respect to the enhancement layer encoding performed by enhancement layer encoder 150 once prediction unit 110 has determined that an enhancement layer video block should be coded based on base layer data. More generally, however, prediction unit 110 may also support a wide variety of other types of prediction techniques, including enhancement layer prediction based on previous reconstructed enhancement layer data. Prediction unit 110, for example, may support intra-based spatial prediction and inter-based temporal prediction entirely within the enhancement layer. The techniques of this disclosure, more specifically, apply when prediction unit 110 supports inter-layer prediction in which base layer data is used in the prediction of enhancement layer data.

Once prediction unit 110 determines that some type of inter-layer prediction will be used, the techniques of this disclosure may be used. In particular, by controlling switch 118, encoder 150 applies a first inter-layer predictive coding technique to any enhancement layer video blocks that correspond to intra-coded base layer blocks. The first inter-layer predictive coding technique includes generating a residual video block as a difference between the N-bit enhancement layer video block and an upsampled N-bit version of a corresponding reconstructed M-bit base layer video block. The upsampled N-bit version of the corresponding reconstructed M-bit base layer video block may be provided to adder 114 by inverse tone mapping unit 116.

For any enhancement layer video blocks that correspond to inter-coded base layer blocks, switch 118 selects between two different prediction paths. Switch 118 may comprise control logic (or a software routine) that controls the prediction path, e.g., whether the first inter-layer predictive coding technique or a second inter-layer predictive coding technique is used. If the N-bit enhancement layer video block corresponds to an inter block, switch 118 causes adder to select between two different predictive paths. The first path corresponds to a first inter-layer predictive coding technique and the second path corresponds to a second inter-layer predictive coding technique. As noted, the second inter-layer predictive coding technique includes generating the residual video block as a difference between the N-bit enhancement layer video block and an N-bit prediction block that is identified by a motion vector associated with a corresponding M-bit base layer video block.

Enhancement layer encoder 150 may then encode information to be used by a decoder so that the decoder can determine how to decode the encoded data. In particular, enhancement layer encoder 150 encodes information within an encoded enhancement layer bitstream to be used by a decoder to determine whether the first inter-layer predictive coding technique or the second inter-layer predictive coding technique was used to encode the N-bit enhancement layer video block.

Such syntax may include first syntax information that indicates whether inter-layer prediction is used, which may comprise one bit per video block. In addition, the syntax may include second syntax information to be used by the decoder, which may comprise another bit of information per video block wherein inter-layer prediction is used, which identifies whether the first inter-layer predictive coding technique or the second inter-layer predictive coding technique was used.

Alternatively, as discussed above, the second syntax information to be used by the decoder may comprise one bit of information per video block which corresponds to inter base layer block since enhancement layer blocks that correspond to intra base layer blocks may always be coded using the first inter-layer predictive coding technique, and the decoder may be programmed to know that enhancement layer blocks that correspond to intra base layer blocks should be decoded using the first inter-layer predictive coding technique (assuming that inter-layer prediction is supported as indicated by the first syntax information). In this case, a combination of the one bit of second syntax information and a determination of whether the N-bit enhancement layer video block corresponds to an intra base layer block or an inter base layer block identifies whether the first inter-layer predictive coding technique or the second inter-layer predictive coding technique was used. In other words, the second syntax information may comprise one bit per video block for which inter-layer prediction is used and for which the corresponding base layer video block is inter coded.

Again, the implementation decision of whether to include one bit per video block for this second syntax information, or alternatively, to only include one bit per video block for which inter-layer prediction is used and for which the corresponding base layer video block is inter coded may depend upon whether the decoder will support separate entropy decoding and parsing of the enhancement layer and the base layer bitstreams. If separate entropy decoding and parsing of the enhancement layer and the base layer bitstreams is desired, e.g., to accelerate the decoding, then one bit per video block (e.g., that are coded based on a corresponding intra base layer block or a corresponding inter base layer block) should be used for the second syntax rather than simply one bit per video block only for blocks coded based on a correspond inter base layer block. Otherwise, the decoder may require knowledge of the coding type of the decoded base layer video block in order to make determinations for the enhancement layer video block whether to decode the bit that identifies either of the first inter-layer predictive coding technique and the second inter-layer predictive coding technique.

The encoded enhancement layer video blocks, as well as any prediction syntax and any additional bits to be used by the decoder to identify the predictive coding technique to be used for the video blocks may be entropy coded by unit 106. Multiplexing unit 118 may then combine the base layer bitstream with the enhancement layer bitstream to create an output bitstream. The output bitstream may be stored, and/or modulated and transmitted to another device.

In some aspects, the techniques of this disclosure differ from conventional techniques insofar as the techniques provide a unique and useful combination of prediction paths. Enhancement layer prediction is allowed based on predictive data (e.g., motion vectors) associated with corresponding base layer data. On the other hand, enhancement layer prediction is also allowed based on upsampled versions of corresponding base layer data, and this type of prediction is allowed for either enhancement layer video blocks that correspond to inter coded base layer blocks or enhancement layer video blocks that correspond to intra coded base layer blocks. Again, these techniques apply on the condition that some form of inter-layer prediction is selected in which some type of base layer data will be used in the prediction of enhancement layer data.

Figure 3:
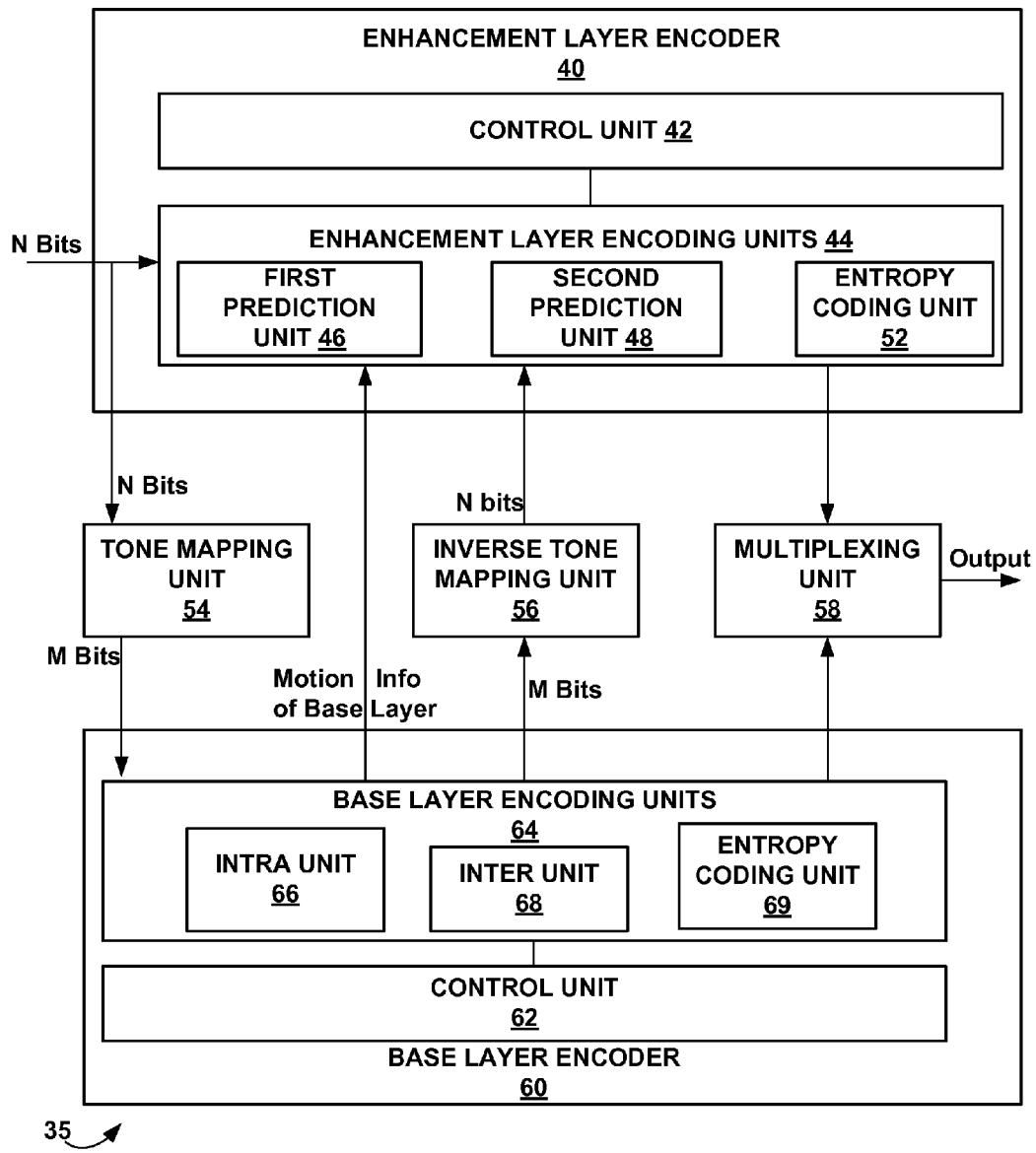
FIG. 3 is another block diagram illustrating a video encoder consistent with this disclosure.

FIG. 3 is a block diagram illustrating an exemplary scalable video encoder 35 that may correspond to scalable bitdepth video encoder 22 of FIG. 1. Scalable video encoder 35 comprises a base layer encoder 60 and an enhancement layer encoder 40. Although illustrated separately, in some implementations, various units of base layer encoder 60 and an enhancement layer encoder 40 may be shared or combined. Base layer encoder 60 encodes base layer video blocks, whereas enhancement layer encoder 40 encodes enhancement layer video blocks. On the encoding side, the techniques of this disclosure generally concern the encoding of enhancement layer video blocks by enhancement layer encoder 40 upon determining that an N-bit enhancement layer video block should be coded based on the base layer.

Enhancement layer encoder 40 may comprise various encoding units 44 that are controlled by a control unit 42. Similarly, base layer encoder 60 may comprise various encoding units 64 that are controlled by a control unit 62. Scalable video encoder 35 also comprises a tone mapping unit 54 that downsamples N-bit samples from enhancement layer encoder 40 to M-bit samples for base layer encoder 60. In addition, scalable video encoder 35 comprises an inverse tone mapping unit 55 that upsamples M-bit samples from base layer encoder 60 to N-bit samples for enhancement layer encoder 40. A multiplexing unit 58 may combine the enhancement layer bitstream that carries information for reconstruction of the N-bit output samples from enhancement layer encoder 40 with the base layer bitstream that carries information for reconstruction of the M-bit output samples from base layer encoder 60 in order to generate a scaled output stream of coded digital video data. Multiplexing unit 58 may combine such data in accordance with an MPEG-2 file format.

For base layer encoding, base layer encoder 60 includes an intra unit 66, an inter unit 68 and an entropy coding unit 69. Various other units, such as a quantization unit and a DCT unit are also commonly used in predictive video coding, but are not illustrated in FIG. 3 for simplicity and ease of illustration. Intra unit 66 performs intra-based encoding of intra video blocks, while inter unit 68 performs inter-based encoding of inter video blocks. Entropy coding unit 69 further compresses the encoded data and syntax information according to an entropy coding methodology.

For intra-based encoding of base layer video blocks, intra unit 66 may generate predictive data based on data within the same coded unit (e.g., the same frame or slice) as the video block being coded. The predictive data is subtracted from the video block being coded to generate a residual, which may then be transformed and quantized. The residual data and the prediction syntax (e.g., identifying the mode or manner of intra prediction that was applied) may be supplied to entropy coding unit 69 for entropy coding.

For inter-based encoding of base layer video blocks, inter unit 68 may generate predictive data based on data within a different coded unit (e.g., a previous or subsequent frame or slice of a video sequence). The predictive data is subtracted from the video block being coded to generate a residual, which may then be transformed and quantized. The residual data and the prediction syntax (e.g., one or more motion vectors that identify the predictive block from the previous or subsequent coded unit) may be supplied to entropy coding unit 69 for entropy encoding.

Enhancement layer encoder 40 may perform prediction based encoding in a slightly different way than base layer encoder 60. Specifically, enhancement layer encoder 40 may perform one or more inter-layer prediction techniques that rely on the corresponding base layer data, e.g., the same spatially and temporally located coded unit of the base layer, in order to code an enhancement layer video block. Again, enhancement layer encoder 40 may also support other types of prediction (e.g., one or more other techniques based only on enhancement layer data), but the techniques of this disclosure apply to prediction techniques that rely on base layer data.

According to this disclosure, bitdepth-based scalable video encoding is applied by enhancement layer encoder 40 and base layer encoder 60. Base layer encoder 60 generates the base layer bitstream, whereas enhancement layer encoder 40 generates the enhancement layer bitstream. The base layer bitstream defines video data with bitdepths of M bits, and the enhancement layer bitstream defines an enhancement of video data to bitdepths of N bits, wherein N is larger than M.

The techniques of this disclosure specifically apply with respect to the enhancement layer encoding performed by enhancement layer encoder 40 when enhancement layer encoder 40 determines that an N-bit enhancement layer video block should be coded based on the base layer. Enhancement layer encoder 40 includes various encoding units 44, including a first prediction unit 46, a second prediction unit 48, and an entropy coding unit 52. These various encoding units 44 may be integrated, and/or may have shared logic or routines in order to execute the different types of coding described herein. Furthermore, as with base layer encoder 60, enhancement layer encoder 40 may further include a quantization unit and transform unit (not shown), e.g., to transform residual video blocks to DCT coefficients and to quantize the DCT coefficients. Again, these components are not shown in FIG. 3 for simplicity and ease of illustration, but could be viewed as being part of the first and second prediction units 46 and 48. It should also be noted that enhancement layer encoder 60 may also support intra and inter prediction in the N-bit domain. These intra and inter units of enhancement layer encoder 60 are not shown for simplicity and ease of illustration.

First prediction unit 46 may be used for the encoding of enhancement layer video blocks that correspond to intra coded base layer video blocks. First prediction unit 46 applies a first inter-layer predictive coding technique that includes generating a residual video block as a difference between the N-bit enhancement layer video block and an upsampled N-bit version of a corresponding reconstructed M-bit base layer video block. The upsampled N-bit version of the corresponding reconstructed M-bit base layer video block may be provided to first prediction unit 46 by inverse tone mapping unit 56.

Second prediction unit 48 applies a second type of predictive coding technique, which includes generating the residual video block as a difference between the N-bit enhancement layer video block and an N-bit prediction block that is identified by a motion vector associated with a corresponding M-bit base layer video block. In this case, rather than using an upsampled version of the corresponding base layer video block, second prediction unit 48 50 simply uses the prediction syntax (e.g., the motion vector) of the corresponding base layer video block in order to perform motion compensation with respect to enhancement layer data. Second prediction unit 48 may comprise memory that stores previous reconstructed enhancement layer data (e.g., decoded versions of previously encoded frames or slices). Using the motion vector associated with a corresponding base layer video block (e.g., "motion info of base layer"), second prediction unit 48 can perform motion compensation with respect to this stored enhancement layer data in order to generate a predictive block in the N-bit domain.

Thus, according to this disclosure, control unit 42 determines whether an N-bit enhancement layer video block corresponds to an intra base layer block or an inter base layer block. If the N-bit enhancement layer video block corresponds to an intra base layer block, at the direction of control unit 42, first prediction unit 46 codes the N-bit enhancement layer video block according to the first inter-layer predictive coding technique, wherein the first inter-layer predictive coding technique includes generating a residual video block as a difference between the N-bit enhancement layer video block and an upsampled N-bit version of a corresponding reconstructed M-bit base layer video block. If the N-bit enhancement layer video block corresponds to an inter base layer block, control unit 42 selects between the first inter-layer predictive coding technique (which may be applied by first prediction unit 46) and a second inter-layer predictive coding technique (which may be applied by second prediction unit 48). As noted, the second inter-layer predictive coding technique includes generating the residual video block as a difference between the N-bit enhancement layer video block and an N-bit prediction block that is identified by a motion vector associated with a corresponding M-bit base layer video block.

Control unit 42 then encodes information to be used by a decoder so that the decoder can determine how to decode the encoded data. In particular, control unit 42 encodes information within an encoded bitstream to be used by a decoder to determine whether the first inter-layer predictive coding technique or the second inter-layer predictive coding technique was used to encode the N-bit enhancement layer video block. In one example, this "second" syntax information to be used by the decoder comprises one bit of information per video block for which inter-layer prediction is used, wherein a combination of the one bit of information and a determination of whether the N-bit enhancement layer video block corresponds to an intra block or an inter block identifies whether the first inter-layer predictive coding technique or the second inter-layer predictive coding technique was used.

Alternatively, the "second" syntax information to be used by the decoder may comprise one bit of information per video block that was coded based on an inter base layer video block since enhancement layer blocks that were coded based on intra base layer blocks may always be coded using the first inter-layer predictive coding technique, and the decoder may be programmed to know that enhancement layer blocks that correspond to intra base layer blocks should be decoded using the first inter-layer predictive coding technique. In this case, a combination of the one bit of information and a determination of whether the N-bit enhancement layer video block corresponds to an intra block or an inter block identifies whether the first inter-layer predictive coding technique or the second inter-layer predictive coding technique was used. Again, the "second" syntax information is only coded if the "first" syntax information which is one bit per video block identifies whether any form of inter-layer prediction is selected.

For this "second" syntax information, the decision to include one bit per video block, or alternatively, to only include one bit per video block that corresponds to inter base layer video block may depend upon whether the decoder will support separate entropy decoding and parsing of the enhancement layer and the base layer. If separate entropy decoding and parsing of the enhancement layer and the base layer is desired, e.g., to accelerate the decoding, then one bit per video block should be used rather than simply one bit per inter block. Otherwise, the decoder may require knowledge of the coding type of the corresponding base layer video block in order to make determinations for the enhancement layer video block whether to decode the bit that identifies either of the first inter-layer predictive coding technique and the second inter-layer predictive coding technique.

The encoded enhancement layer video blocks, as well as any prediction syntax and any additional bits to be used by the decoder to identify the predictive coding technique to be used for the video blocks may be entropy coded by unit 52. Multiplexing unit 58 may then combine the base layer with the enhancement layer to create an output bitstream. The output bitstream includes the base layer, the enhancement layer, and associated syntax. The output bitstream may be stored, and/or modulated and transmitted to another device.

Figure 4:
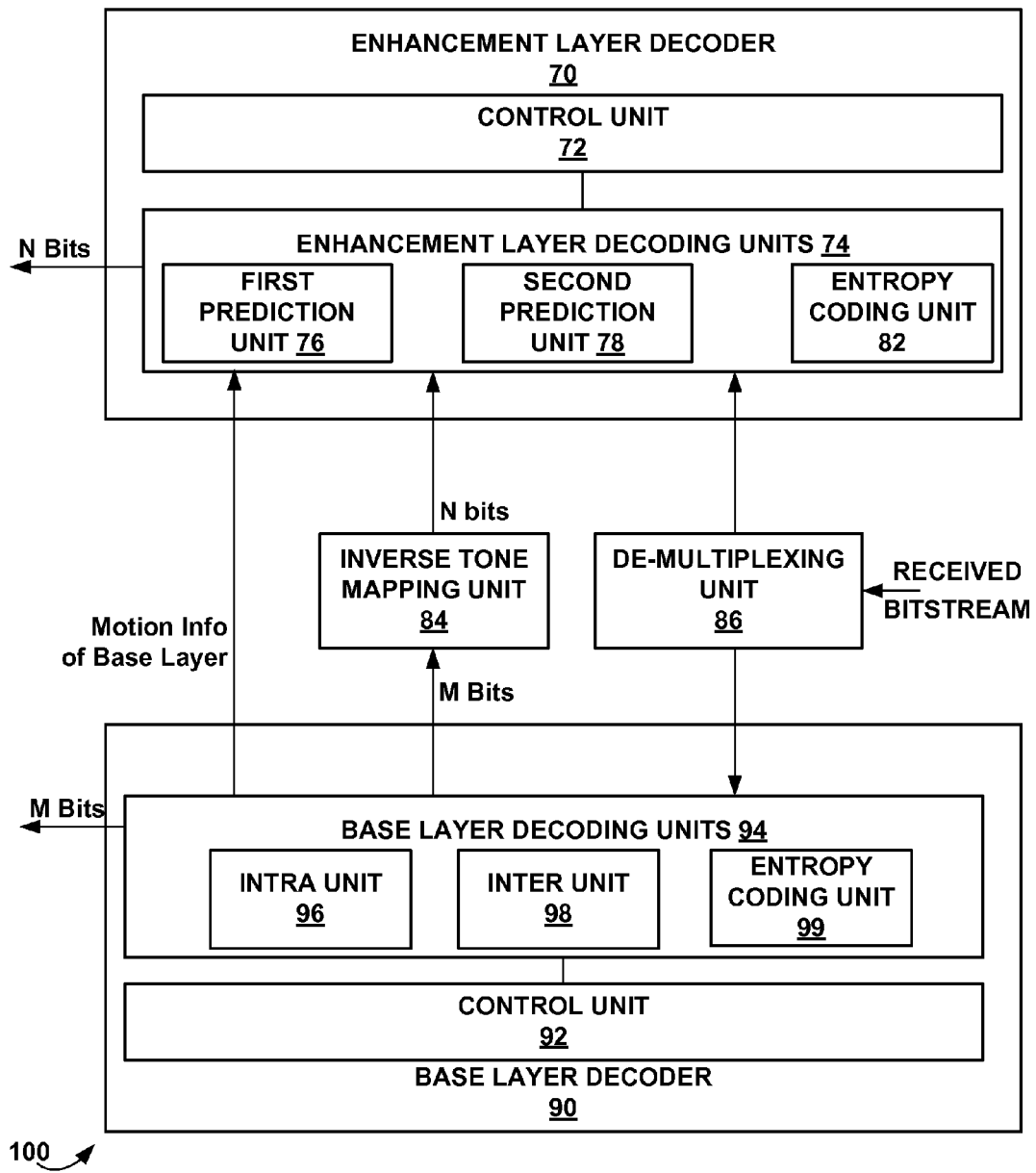
FIG. 4 is a block diagram illustrating an exemplary video decoder consistent with this disclosure.

FIG. 4 is a block diagram illustrating an exemplary scalable video decoder 100 that may correspond to scalable bit-depth video decoder 28 of FIG. 1. Scalable video decoder 100 comprises a base layer decoder 90 and an enhancement layer decoder 70. Although illustrated separately, in some implementations, various units of base layer decoder 90 and enhancement layer decoder 90 may be shared or combined. Furthermore, scalable video decoder 100 may be integrated with scalable video encoder 35 (FIG. 2) to form a combined codec (encoder-decoder). In this case, the various components of scalable video decoder 100 may overlap with those of scalable video encoder 35.

Basically, the decoding functionality of scalable video decoder 100 can be viewed as the reciprocal operations of the encoding functionality described above with respect to scalable video encoder 35. Base layer decoder 90 decodes base layer video blocks, whereas enhancement layer decoder 70 decodes enhancement layer video blocks. De-multiplexing unit 86 receives an SVC bitstream and separates the base layer data from the enhancement layer data. The received base layer data is sent to base layer decoder 90, and the enhancement layer data is sent to enhancement layer decoder 70. On the decoding side, the techniques of this disclosure generally concern the decoding of enhancement layer video blocks by enhancement layer decoder 70 upon determining that an N-bit enhancement layer video block was coded based on the base layer. First syntax information in the bitstream, comprising one bit per video block, may indicate whether an N-bit enhancement layer video block was coded based on the base layer, e.g., by indicating whether inter-layer prediction is enabled for that video block.

As illustrated, enhancement layer decoder 70 may comprise various decoding units 74 that are controlled by a control unit 72. Similarly, base layer decoder 90 may comprise various decoding units 94 that are controlled by a control unit 92. Scalable video decoder 100 also comprises an inverse tone mapping unit 84 that upsamples M-bit samples from base layer decoder 90 to N-bit samples for enhancement layer decoder 70. A de-multiplexing unit 58 may separate a received bitstream into the base layer and enhancement layer. Separate entropy coding units 82 and 99 may be included in enhancement layer decoder 70 and base layer decoder 90, respectively, although a combined entropy decoding unit might alternatively be used for some embodiments.

The implementation of separate entropy coding units 82 and 99 for the base and enhancement layers may accelerate the decoding process. In this case, it is desirable for the coded bitstream to include one bit per video block to identify whether the first or second inter-layer predictive coding technique was used, regardless of whether the corresponding base layer video block is intra or inter coded. If one bit were sent only for the blocks that correspond to inter base layer blocks, entropy coding unit 32 of enhancement layer decoder 70 would need to wait for entropy coding unit 99 of base layer decoder 90 to parse the base layer bitsteam so that enhancement layer decoder 70 could identify base layer block types. To avoid delay, in this case, it may be desirable to include one bit per video block to identify whether the first or second inter-layer predictive coding technique was used even for enhancement layer blocks that correspond to base layer intra blocks, which may always be coded according to the first inter-layer predictive coding technique. Again, this one-bit syntax information is only decoded if a first one-bit syntax information (already decoded) identifies that inter-layer prediction was enabled.

For base layer decoding, base layer decoder 90 includes an intra unit 96, an inter unit 98 and an entropy coding unit 99. Various other units, such as a de-quantization unit and an inverse transform unit are also commonly used in predictive video decoding, but are not illustrated in FIG. 4 for simplicity and ease of illustration. Intra unit 96 performs intra-based decoding of intra video blocks, while inter unit 98 performs inter-based decoding of inter video blocks. Entropy decoding unit 99 parses the received base layer bitstream to decompress coded data and syntax information according to an entropy decoding methodology.

For intra-based decoding of base layer video blocks, intra unit 96 may receive a residual video block, e.g., following de-quantization and inverse transform, which are not shown in FIG. 4 for simplicity and ease of illustration. Intra unit 96 may generate predictive data based on data within the same coded unit (e.g., the same frame or slice) as the residual video block being decoded. Prediction syntax (such as the intra mode to be used to generate the prediction data) may form part of the received bitstream, and this prediction syntax may be used to generate the predictive data. The predictive data is added to the residual video block, which forms a reconstructed video block.

For inter-based decoding of base layer video blocks, inter unit 98 may receive a residual video block, e.g., following de-quantization and inverse transform. In this case, inter unit 98 generates predictive data based on data within a different coded unit (e.g., a previous or subsequent frame or slice of a video sequence). Prediction syntax (in this case, e.g., one or more motion vectors used to generate the prediction data) may form part of the received bitstream, and this prediction syntax may be used to generate the predictive data. The predictive data is added to the residual video block, which forms a reconstructed video block.

Enhancement layer decoder 70 may perform predictive based decoding in a slightly different way than base layer decoder 90. Specifically, enhancement layer decoder 70 may perform one or more inter-layer prediction techniques that rely on the corresponding base layer data, e.g., the same spatially and temporally located coded unit of the base layer, in order to decode an enhancement layer video block.

The techniques of this disclosure may specifically apply with respect to the enhancement layer decoding performed by enhancement layer decoder 70 once enhancement layer decoder 70 determines that a given enhancement layer video block was coded based on base layer data using some type of inter-layer prediction. Enhancement layer decoder 70 may examine a first bit of syntax information to make this initial determination.

Enhancement layer decoder 70 includes various decoding units 74, including a first prediction unit 76, a second prediction unit 78, and an entropy coding unit 82. As with the encoder, these various decoding units 74 of enhancement layer decoder 70 may be integrated, and/or may have shared logic or routines in order to execute the different types of coding described herein. Furthermore, as with base layer decoder 90, enhancement layer decoder 70 may further include a de-quantization unit and an inverse transform unit (not shown), e.g., to de-quantize transform coefficients, and to inverse transform the dequantized coefficients to residual video blocks in the pixel domain. As with FIG. 3, these components are not shown in FIG. 4 for simplicity and ease of illustration, but could be viewed as being part of first and second prediction coding units 76 and 78. Also, it should be noted that enhancement layer decoder 70 may also support intra and inter prediction in the N-bit domain. These intra and inter units of enhancement layer decoder 70 are not shown for simplicity and ease of illustration.

First prediction unit 76 may be used for the decoding of enhancement layer video blocks that correspond to intra coded base layer video blocks. First prediction unit 76 applies a first inter-layer predictive coding technique that includes generating a reconstructed video block as a sum of the N-bit residual enhancement layer video block and an upsampled N-bit version of a corresponding reconstructed M-bit base layer video block. The upsampled N-bit version of the corresponding reconstructed M-bit base layer video block may be provided to first prediction unit 76 by inverse tone mapping unit 84.

Second prediction unit 78 applies a second type of predictive coding technique, which includes generating the reconstructed video block as a sum of the N-bit residual enhancement layer video block and an N-bit prediction block that is identified by a motion vector associated with a corresponding M-bit base layer video block. In this case, rather than using an upsampled version of the corresponding base layer video block, second prediction unit 78 simply uses the prediction syntax such as the motion vectors (e.g. "motion information of base layer" shown in FIG. 4) of the corresponding base layer video block in order to perform motion compensation with respect to enhancement layer data, which may be reconstructed enhancement layer video frames or slices stored in memory (not shown) associated with enhancement layer decoder 70.

According to this disclosure, control unit 72 determines whether an N-bit enhancement layer video block corresponds to an intra block or an inter block in the base layer. If the N-bit residual enhancement layer video block corresponds to an intra block in the base layer, at the direction of control unit 72, first prediction unit 76 decodes the N-bit enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block.

If the N-bit residual enhancement layer video block corresponds to an inter base layer block, control unit 72 selects between the first inter-layer predictive coding technique (which may be applied by first prediction unit 76) and a second inter-layer predictive coding technique (which may be applied by second prediction unit 78). As noted, the second inter-layer predictive coding technique includes generating the reconstructed video block as a sum of the N-bit residual enhancement layer video block and an N-bit prediction block that is identified by a motion vector associated with a corresponding M-bit base layer video block.

Control unit 72 also decodes information that can help enhancement layer decoder 70 determine how to decode the encoded data. In particular, control unit 72 decodes information within an encoded bitstream in order to determine whether the first inter-layer predictive coding technique or the second inter-layer predictive coding technique was used to encode the N-bit enhancement layer video block. In one example, this information to be used by enhancement layer decoder 70 comprises one bit of "second" syntax information per video block that is inter-layer coded to indicate whether the first inter-layer predictive coding technique or the second inter-layer predictive coding technique was used. The "first" syntax information, in contrast, specifies whether the prediction of the enhancement layer video block used information of the base layer. As such, the "second" syntax information is received only when the first syntax information identifies that the prediction of the enhancement layer video block used information of the base layer.

Alternatively, the information to be used by enhancement layer decoder 70 may comprise one bit of "second" syntax information per video block that corresponds to an inter base layer block since enhancement layer blocks that correspond to intra base layer blocks may always be coded using the first inter-layer predictive coding technique, and enhancement layer decoder 70 may be programmed to know that enhancement layer blocks that correspond to intra base layer blocks should be decoded using the first inter-layer predictive coding technique. In this case, a combination of the one bit of information and a determination of whether the N-bit enhancement layer video block corresponds to an intra block or an inter block in the base layer identifies whether the first inter-layer predictive coding technique or the second inter-layer predictive coding technique was used.

The implementation decision of whether to include one bit per video block that is inter-layer coded for the "second" syntax information, or alternatively, to only include one bit per video block that specifically correspond to inter base layer block may depend upon whether scalable bit-depth video encoder 100 supports separate entropy decoding and parsing of the enhancement layer and the base layer. If, as illustrated in FIG. 4, separate entropy decoding and parsing of the enhancement layer and the base layer is implemented, e.g., to accelerate the decoding, then one bit per video block should be used rather than simply one bit per video block that corresponds to inter base layer block. Otherwise, enhancement layer decoder 70 may require knowledge of the coding type of the decoded base layer video block in order to make determinations for the enhancement layer video block whether to decode the bit that identifies either of the first inter-layer predictive coding technique and the second inter-layer predictive coding technique.

Figure 5:
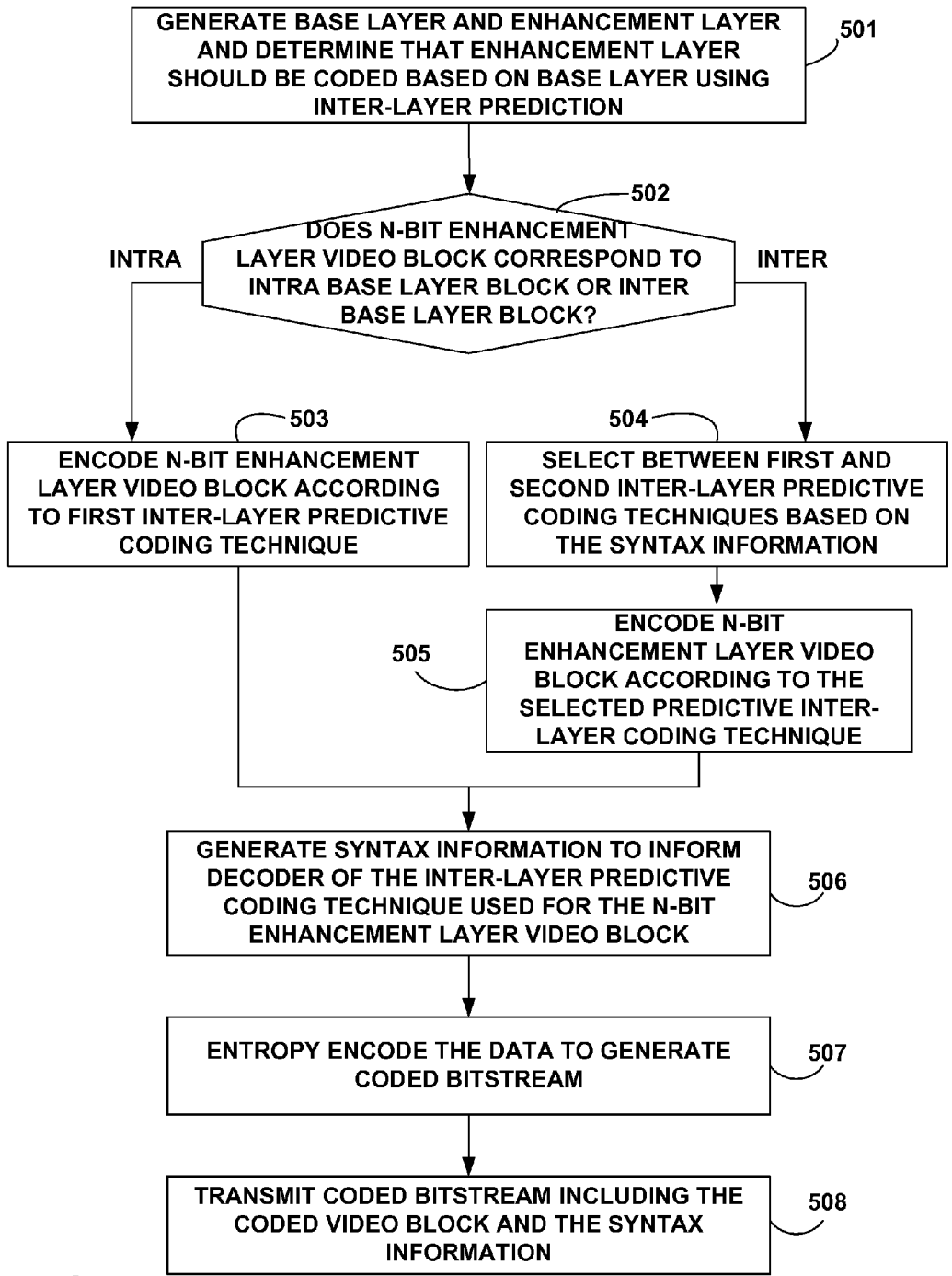
FIG. 5 and 6 are flow diagrams illustrating exemplary encoding and decoding techniques consistent with this disclosure.

FIG. 5 is a flow diagram illustrating an exemplary encoding technique consistent with this disclosure. FIG. 5 will be described from the perspective of scalable video encoder 35 of FIG. 3. As shown in FIG. 5, scalable video encoder 35 generates a base layer and an enhancement layer and an enhancement layer video block, scalable video encoder 35 determines that the enhancement layer video block should be coded based on base layer data (501). For example, scalable video encoder 35 may receive N-bit samples, provide the N-bit samples to enhancement layer encoder 40 to define the enhancement layer, and downsample the N-bit samples to M-bit samples to define the base layer. The base layer and the enhancement layer may be coded separately by base layer encoder 60 and enhancement layer encoder 40, respectively. When enhancement layer encoder 40 determines that the enhancement layer video block should be coded based on base layer data, the techniques of FIG. 5 may be applied.

In this case, for enhancement layer encoding, control unit 42 determines whether an N-bit enhancement layer video block corresponds to an intra base layer block or an inter base layer block in the base layer (502). If the enhancement layer video block corresponds to an intra base layer block ("intra" 502), first prediction unit 46 encodes the N-bit enhancement layer video block according to a first inter-layer predictive technique (503). The first inter-layer predictive coding technique includes generating a residual video block as a difference between the N-bit enhancement layer video block and an upsampled N-bit version of a corresponding reconstructed M-bit base layer video block. On the other hand, if the enhancement layer video block corresponds to an inter base layer block ("inter" 502), control unit 42 selects between the first inter-layer predictive coding technique and a second inter-layer predictive coding technique (504). One or more of units 44 encode the N-bit enhancement layer video block according to the selected predictive coding technique (505). In particular, depending upon the selection, first prediction unit 46 may perform the first inter-layer predictive coding technique or second first prediction unit 48 may perform the second inter-layer predictive coding technique.

Control unit 42 may perform the selection between the first and second inter-layer predictive coding technique (504) by applying a rate-distortion algorithm. In particular, control unit 42 may consider video quality differences between the video block coded by the first inter-layer predictive coding technique and by the second inter-layer predictive coding technique. In addition, control unit 42 may consider the level of compression achieved if the video block is coded using the first inter-layer predictive coding technique or using the second inter-layer predictive coding technique. In some cases, enhancement layer encoder 40 may actually encode the video block using both inter-layer prediction techniques, and then make the selection (504) based on quality and the level of compression. Depending on the scenario, it may be more desirable to achieve the best quality possible, i.e., lowest amount of distortion, or the best compression, e.g., to facilitate the best rate of data communication. In some cases, these factors are balanced according to a rate-distortion algorithm in order to make the selection.

Control unit 42 may also generate syntax information to inform a decoder of the predictive coding technique that was used for the N-bit enhancement layer video block (506). As discussed in greater detail above, this syntax information may include first syntax information to indicate that base layer data is used to encode enhancement layer video blocks (i.e., inter-layer prediction is used), and second syntax information that is used to inform the decoder of the type of inter-layer prediction technique used. The first syntax information may comprise one bit per video block. The second syntax information may comprise one bit per video block that is inter-layer coded, or one bit per inter-layer coded video block that specifically corresponds to inter base layer block. As discussed above, one bit per video block that corresponds to inter base layer block has the advantage of higher levels of compression, while one bit for every video block that is inter-layer coded has the advantage of facilitating separate entropy coding and parsing of the base and enhancement layers at the decoder, which may accelerate the decoding process. In any case, entropy coding unit 52 may entropy encode the data (including the coded video block and the syntax information) to generate a coded bitstream (507). Scalable video encoder 35 may then forward the coded bitstream to one or more modulators and transmitters for signal modulation and transmission of the coded bitstream to another device (508), such as via modulator/transmitter 24 of FIG. 1.

Figure 6:
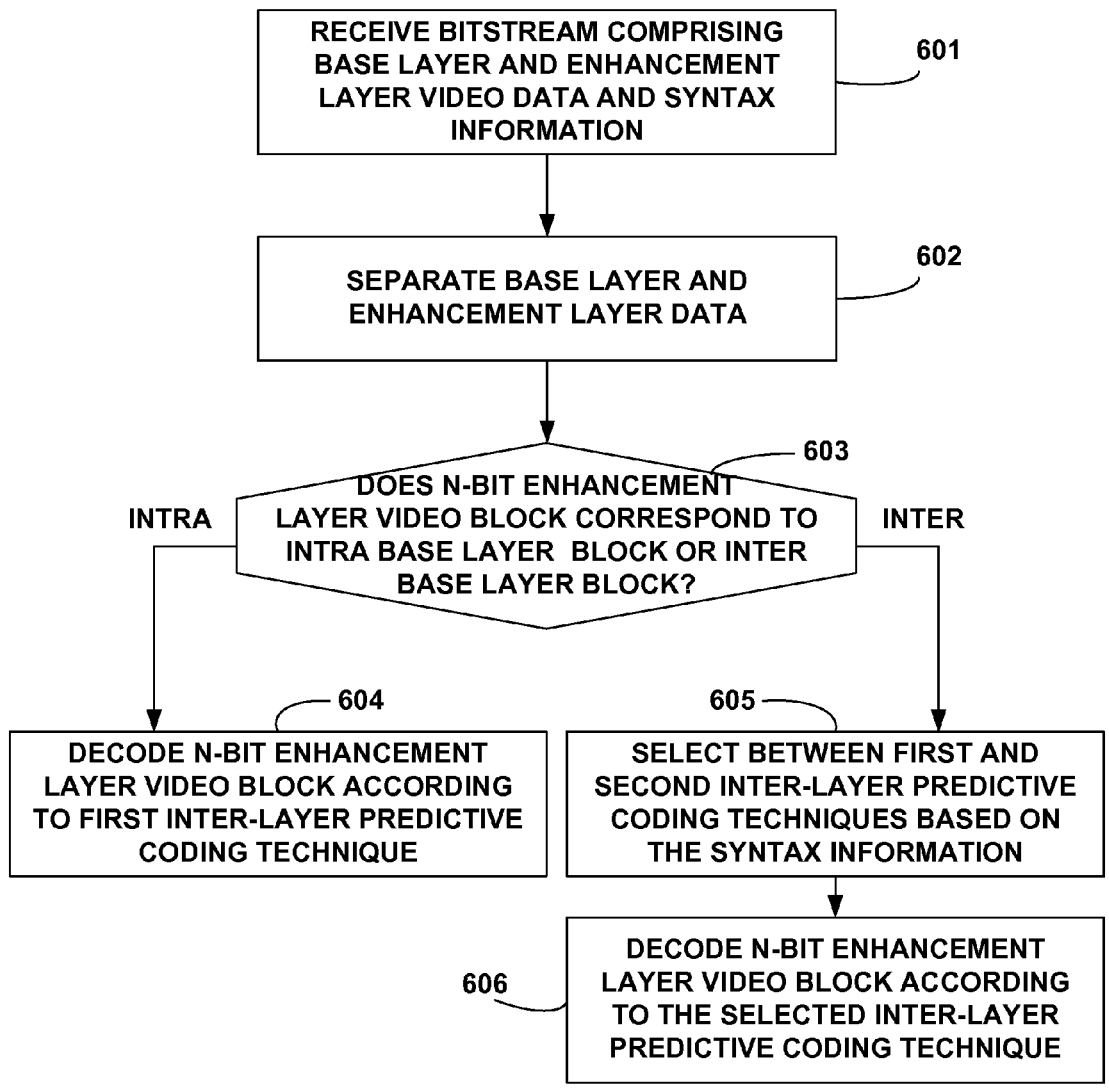

FIG. 6 is a flow diagram illustrating an exemplary decoding technique consistent with this disclosure. FIG. 6 will be described from the perspective of scalable video encoder 100 of FIG. 3. As shown in FIG. 6, scalable video decoder 100 receives a bitstream comprising base layer and enhancement layer video data and syntax information (601). De-multiplexing unit 86 separates the base layer and enhancement layer data (602), and forwards the data to enhancement layer decoder 70 and base layer decoder 90, respectively. The syntax information may include first syntax information indicating whether base layer data was used to encode enhancement layer video blocks (i.e., whether inter layer prediction is used), and second syntax information used to inform the decoder of the type of inter-layer prediction technique used. If the first syntax information does not indicate that base layer data was used to encode enhancement layer video blocks, the techniques of this disclosure may not apply. On the contrary, the techniques of this disclosure specifically apply when the first syntax information indicates that base layer data was used to encode enhancement layer video blocks using inter-layer prediction.

In enhancement layer decoder 70, control unit 72 determines whether an N-bit enhancement layer video block corresponds to an intra block or an inter block in the base layer (603). If the enhancement layer video block corresponds to an intra base layer block ("intra" 503), first prediction unit 76 decodes the N-bit enhancement layer video block according to a first inter-layer predictive technique (604). In particular, for decoding, the first inter-layer predictive coding technique includes generating a reconstructed video block as a sum of the N-bit residual enhancement layer video block and an upsampled N-bit version of a corresponding reconstructed M-bit base layer video block.

On the other hand, if the enhancement layer video block corresponds to an inter base layer block ("inter" 603), control unit 72 selects between the first inter-layer predictive coding technique and a second inter-layer predictive coding technique (605), and decodes the N-bit enhancement layer video block according to the selected predictive technique (606). In particular, depending upon the selection, first prediction unit 76 may perform the first inter-layer predictive coding technique or second prediction unit 78 may perform the second inter-layer predictive coding technique. Again, the first inter-layer predictive coding technique includes generating a reconstructed video block as a sum of the N-bit residual enhancement layer video block and an upsampled N-bit version of a corresponding reconstructed M-bit base layer video block. In contrast, the second inter-layer predictive coding technique, for decoding, includes generating the reconstructed video block as a sum of the N-bit residual enhancement layer video block and an N-bit prediction block that is identified by a motion vector associated with a corresponding M-bit base layer video block. The selection ("605") may be based at least in part on the "second" syntax information in the bitstream, which as outlined above, may be defined at the encoder to determine whether the first inter-layer predictive coding technique or the second inter-layer predictive coding technique should be used to decode the N-bit residual enhancement layer video block.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset application specific integrated circuit (ASIC), field programmable gate array (FPGA), logic, or various combinations thereof configured to perform one or more of the techniques described herein.

Various embodiments of the invention have been described. These and other embodiments are within the scope of the following claims.

The invention claimed is:

1. A method of encoding video data according to a bit-depth-based scalable video coding (SVC) scheme, the method comprising:
    generating a base layer and an enhancement layer associated with the video data, wherein the base layer defines the video data with bitdepths of M bits and the enhancement layer defines an enhancement of the bitdepths to N bits, wherein N is larger than M; and
    encoding the base layer and the enhancement layer, wherein encoding the enhancement layer includes:

determining whether an N-bit enhancement layer video block should be coded based on the base layer using inter-layer prediction, and upon determining that the N-bit enhancement layer video block should be coded based on the base layer using inter-layer prediction:

determining whether the N-bit enhancement layer video block corresponds to an intra base layer block or an inter base layer block;

if the N-bit enhancement layer video block corresponds to an intra base layer block, coding the N-bit enhancement layer video block according to a first inter-layer predictive coding technique, wherein the first inter-layer predictive coding technique includes generating a residual video block as a difference between the N-bit enhancement layer video block and an upsampled N-bit version of a corresponding reconstructed M-bit base layer video block; and if the N-bit enhancement layer video block corresponds to an inter base layer block, selecting between the first inter-layer predictive coding technique and a second inter-layer predictive coding technique, wherein the second inter-layer predictive coding technique includes generating the residual video block as a difference between the N-bit enhancement layer video block and an N-bit prediction block that is identified by a motion vector associated with a corresponding M-bit base layer video block.

2. The method of claim 1, the method further comprising:

encoding first information to be used by a decoder to determine that the N-bit enhancement layer video block was coded based on the base layer using inter-layer prediction; and encoding second information to be used by a decoder to determine whether the first inter-layer predictive coding technique or the second inter-layer predictive coding technique was used to encode the N-bit enhancement layer video block.

3. The method of claim 2, wherein the first information to be used by the decoder comprises one bit of information per video block and the second information to be used by the decoder comprises one bit of information per video block for which inter-layer prediction is used.

4. The method of claim 2, wherein the first information to be used by the decoder comprises one bit of information per video block and the second information to be used by the decoder comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

5. A method of decoding video data according to a bit-depth-based scalable video coding (SVC) scheme, the method comprising:

receiving a base layer and an enhancement layer associated with the video data, wherein the base layer defines the video data with bitdepths of M bits and the enhancement layer defines an enhancement of the bitdepths to N bits, wherein N is larger than M; and decoding the base layer and the enhancement layer, wherein decoding the enhancement layer includes:

determining whether an N-bit enhancement layer video block was coded based on the base layer using inter-layer prediction, and upon determining that the N-bit enhancement layer video block was coded based on the base layer using inter-layer prediction:

determining whether the N-bit enhancement layer video block corresponds to an intra base layer block or an inter base layer block;

if the N-bit residual enhancement layer video block corresponds to an intra base layer block, decoding the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block; and if the N-bit residual enhancement layer video block corresponds to an inter base layer block, selecting between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

6. The method of claim 5, the method further comprising:

receiving first information to be used to determine whether the N-bit enhancement layer video block was coded based on the base layer using inter-layer prediction; and receiving second information to be used to determine whether the first inter-layer predictive coding technique or the second inter-layer predictive coding technique should be used to decode the N-bit enhancement layer video block.

7. The method of claim 6, wherein the first information to be used to determine whether the N-bit enhancement layer video block was coded based on the base layer using inter-layer prediction comprises one bit of information per video block, and wherein the second information to be used to determine whether the first inter-layer predictive coding technique or the second inter-layer predictive coding technique should be used comprises one bit of information per video block for which inter-layer prediction is used.

8. The method of claim 7, further comprising entropy decoding the base layer and the enhancement layer separately.

9. The method of claim 6, wherein the first information to be used to determine whether the N-bit enhancement layer video block was coded based on the base layer using inter-layer prediction comprises one bit of information per video block, and wherein the second information to be used to determine whether the first inter-layer predictive coding technique or the second inter-layer predictive coding technique should be used comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

10. An apparatus that encodes video data according to a bitdepth-based scalable video coding (SVC) scheme, the apparatus comprising:
- a bitdepth-based scalable video encoder that generates a base layer and an enhancement layer associated with the video data, wherein the base layer defines the video data with bitdepths of M bits and the enhancement layer defines an enhancement of the bitdepths to N bits, wherein N is larger than M, and encodes the base layer and the enhancement layer, wherein for the enhancement layer, wherein the video encoder:
- determines whether an N-bit enhancement layer video block should be coded based on the base layer using inter-layer prediction, and upon determining that the N-bit enhancement layer video block should be coded based on the base layer using inter-layer prediction:
- determines whether an N-bit enhancement layer video block corresponds to an intra base layer block or an inter base layer block;
- if the N-bit enhancement layer video block corresponds to an intra block, encodes the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block; and
- if the N-bit enhancement layer video block corresponds to an inter base layer block, selects between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block.

11. The apparatus of claim 10, wherein the bitdepth-based scalable video encoder:
- encodes first information to be used by a decoder to determine that the N-bit enhancement layer video block was coded based on the base layer using inter-layer prediction; and
- encodes second information to be used by a decoder to determine whether the first inter-layer predictive coding technique or the second inter-layer predictive coding technique was used to encode the N-bit enhancement layer video block.

12. The apparatus of claim 11, wherein the first information to be used by the decoder comprises one bit of information per video block and the second information to be used by the decoder comprises one bit of information per video block for which inter-layer prediction is used.

13. The apparatus of claim 11, wherein the first information to be used by the decoder comprises one bit of information per video block and the second information to be used by the decoder comprises one bit of information per video block for which inter-layer prediction is used and for which a corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

14. The apparatus of claim 10, wherein the apparatus comprises one of an integrated circuit and a microprocessor.

15. An apparatus that decodes video data according to a bitdepth-based scalable video coding (SVC) scheme, the apparatus comprising:
- a bitdepth-based scalable video decoder that receives a base layer and an enhancement layer associated with the video data, wherein the base layer defines the video data with bitdepths of M bits and the enhancement layer defines an enhancement of the bitdepths to N bits, wherein N is larger than M, and decodes the base layer and the enhancement layer, wherein for the enhancement layer, wherein the video decoder:
- determines whether an N-bit enhancement layer video block was coded based on the base layer using inter-layer prediction, and upon determining that the N-bit enhancement layer video block was coded based on the base layer using inter-layer prediction:
- determines whether an N-bit residual enhancement layer video block corresponds to an intra base layer block or an inter base layer block;
- if the N-bit residual enhancement layer video block corresponds to an intra base layer block, decodes the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block; and
- if the N-bit residual enhancement layer video block corresponds to an inter base layer block, selects between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

16. The apparatus of claim 15, wherein the decoder:
- receives first information to be used to determine whether the N-bit enhancement layer video block was coded based on the base layer using inter-layer prediction; and
- receives second information to be used to determine whether the first inter-layer predictive coding technique or the second inter-layer predictive coding technique should be used to decode the N-bit enhancement layer video block.

17. The apparatus of claim 16,
- wherein the first information to be used to determine whether the N-bit enhancement layer video block was coded based on the base layer using inter-layer prediction comprises one bit of information per video block, and
  - wherein the second information to be used to determine whether the first inter-layer predictive coding technique or the second inter-layer predictive coding technique should be used comprises one bit of information per video block for which inter-layer prediction is used.

18. The apparatus of claim 17, wherein the decoder comprises two separate entropy decoding units that entropy decode the base layer and the enhancement layer separately.

19. The apparatus of claim 16,
- wherein the first information to be used to determine whether the N-bit enhancement layer video block was coded based on the base layer using inter-layer prediction comprises one bit of information per video block, and wherein the second information to be used to determine whether the first inter-layer predictive coding technique or the second inter-layer predictive coding technique should be used comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

20. The apparatus of claim 15, wherein the apparatus comprises one of an integrated circuit and a microprocessor.

21. A non-transitory computer-readable medium comprising instructions that upon execution cause a video coding device to encode video data according to a bitdepth-based scalable video coding (SVC) scheme, wherein the instructions cause the device to:

generate a base layer and an enhancement layer associated with the video data, wherein the base layer defines the video data with bitdepths of M bits and the enhancement layer defines an enhancement of the bitdepths to N bits, wherein N is larger than M, and encode the base layer and the enhancement layer, wherein for the enhancement layer, the instructions cause the device to:

determine whether an N-bit enhancement layer video block should be coded based on the base layer using inter-layer prediction, and upon determining that the N-bit enhancement layer video block should be coded based on the base layer using inter-layer prediction:

determine whether an N-bit enhancement layer video block corresponds to an intra base layer block or an inter base layer block;

if the N-bit enhancement layer video block corresponds to an intra base layer block, encode the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block; and if the N-bit enhancement layer video block corresponds to an inter base layer block, select between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block.

22. The non-transitory computer-readable medium of claim 21, wherein the instructions further cause the device to:

encode first information to be used by a decoder to determine that the N-bit enhancement layer video block was coded based on the base layer using inter-layer prediction; and encode second information to be used by a decoder to determine whether the first inter-layer predictive coding technique or the second inter-layer predictive coding technique was used to encode the N-bit enhancement layer video block.

23. The non-transitory computer-readable medium of claim 22, wherein the first information to be used by the decoder comprises one bit of information per video block and the second information to be used by the decoder comprises one bit of information per video block for which inter-layer prediction is used.

24. The non-transitory computer-readable medium of claim 22, wherein the first information to be used by the decoder comprises one bit of information per video block and the second information to be used by the decoder comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

25. A non-transitory computer-readable medium comprising instructions that upon execution cause a video coding device to decode video data according to a bitdepth-based scalable video coding (SVC) scheme, wherein the instructions cause the device to:

upon receiving a base layer and an enhancement layer associated with the video data, wherein the base layer defines the video data with bitdepths of M bits and the enhancement layer defines an enhancement of the bitdepths to N bits, wherein N is larger than M, decode the base layer and the enhancement layer, wherein for the enhancement layer, the instructions cause the device to:

determine whether an N-bit enhancement layer video block was coded based on the base layer using inter-layer prediction, and upon determining that the N-bit enhancement layer video block was coded based on the base layer using inter-layer prediction:

determine whether an N-bit enhancement layer video block corresponds to an intra base layer block or an inter base layer block;

if the N-bit residual enhancement layer video block corresponds to an intra base layer block, decode the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block; and if the N-bit residual enhancement layer video block corresponds to an inter base layer block, select between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

26. The non-transitory computer-readable medium of claim 25, wherein the instructions further cause the device to:

determine whether the first inter-layer predictive coding technique or the second inter-layer predictive coding technique was used to encode the N-bit enhancement layer video block based at least in part on received information defined by an encoder.

27. The non-transitory computer-readable medium of claim 26, wherein the received information defined by an encoder comprises:
first information to be used to determine whether the N-bit enhancement layer video block was coded based on the base layer using inter-layer prediction, wherein the first information comprises one bit of information per video block, and
second information to be used to determine whether the first inter-layer predictive coding technique or the second inter-layer predictive coding technique should be used, wherein the second information comprises one bit of information per video block for which inter-layer prediction is used.

28. The non-transitory computer-readable medium of claim 27, wherein the instructions cause the device to decode the base layer and the enhancement layer separately.

29. The non-transitory computer-readable medium of claim 26, wherein the received information defined by an encoder comprises:
first information to be used to determine whether the N-bit enhancement layer video block was coded based on the base layer using inter-layer prediction, wherein the first information comprises one bit of information per video block, and
second information to be used to determine whether the first inter-layer predictive coding technique or the second inter-layer predictive coding technique should be used, wherein the second information comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

30. A device that encodes video data according to a bit-depth-based scalable video coding (SVC) scheme, the device comprising:
means for generating a base layer and an enhancement layer associated with the video data, wherein the base layer defines the video data with bitdepths of M bits and the enhancement layer defines an enhancement of the bitdepths to N bits, wherein N is larger than M;
means for encoding the base layer; and
means for encoding the enhancement layer, wherein means for encoding the enhancement layer includes:
means for determining whether an N-bit enhancement layer video block should be coded based on the base layer using inter-layer prediction, and upon determining that the N-bit enhancement layer video block should be coded based on the base layer using inter-layer prediction:
means for determining whether an N-bit enhancement layer video block corresponds to an intra base layer block or an inter base layer block;
if the N-bit enhancement layer video block corresponds to an intra base layer block, means for encoding the N-bit enhancement layer video block according to a first inter-layer predictive coding technique, wherein the first inter-layer predictive coding technique includes generating a residual video block as a difference between the N-bit enhancement layer video block and an upsampled N-bit version of a corresponding reconstructed M-bit base layer video block; and
if the N-bit enhancement layer video block corresponds to an inter base layer block, means for selecting between the first inter-layer predictive coding technique and a second inter-layer predictive coding technique, wherein the second inter-layer predictive coding technique includes generating the residual video block as a difference between the N-bit enhancement layer video block and an N-bit prediction block that is identified by a motion vector associated with a corresponding M-bit base layer video block.

31. The device of claim 30, the device further comprising:
means for encoding first information to be used by a decoder to determine that the N-bit enhancement layer video block was coded based on the base layer using inter-layer prediction; and
means for encoding second information to be used by a decoder to determine whether the first inter-layer predictive coding technique or the second inter-layer predictive coding technique was used to encode the N-bit enhancement layer video block.

32. The device of claim 31, wherein the first information to be used by the decoder comprises one bit of information per video block and the second information to be used by the decoder comprises one bit of information per video block for which inter-layer prediction is used.

33. The device of claim 31, wherein the first information to be used by the decoder comprises one bit of information per video block and the second information to be used by the decoder comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

34. A device that decodes video data according to a bit-depth-based scalable video coding (SVC) scheme, the device comprising:
means for receiving a base layer and an enhancement layer associated with the video data, wherein the base layer defines the video data with bitdepths of M bits and the enhancement layer defines an enhancement of the bitdepths to N bits, wherein N is larger than M; and
means for decoding the base layer; and
means for decoding the enhancement layer, wherein means for decoding the enhancement layer includes:
means for determining whether an N-bit enhancement layer video block was coded based on the base layer using inter-layer prediction, and upon determining that the N-bit enhancement layer video block was coded based on the base layer using inter-layer prediction:
means for determining whether an N-bit residual enhancement layer video block corresponds to an intra base layer block or an inter base layer block;
if the N-bit residual enhancement layer video block corresponds to an intra base layer block, means for decoding the N-bit residual enhancement layer video block according to a first inter-layer predictive coding technique, wherein the first inter-layer predictive coding technique includes generating a reconstructed video block as a sum of the N-bit residual enhancement layer video block and an up sampled N-bit version of a corresponding reconstructed M-bit base layer video block; and if the N-bit residual enhancement layer video block corresponds to an inter base layer block, means for selecting between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

35. The device of claim 34, the device further comprising:
means for receiving first information to be used to determine whether the N-bit enhancement layer video block was coded based on the base layer using inter-layer prediction; and
means for receiving second information to be used to determine whether the first inter-layer predictive coding technique or the second inter-layer predictive coding technique should be used to decode the N-bit enhancement layer video block.

36. The device of claim 35,
wherein the first information to be used to determine whether the N-bit enhancement layer video block was coded based on the base layer using inter-layer prediction comprises one bit of information per video block, and
wherein the second information to be used to determine whether the first inter-layer predictive coding technique or the second inter-layer predictive coding technique should be used comprises one bit of information per video block for which inter-layer prediction is used.

37. The device of claim 36, further comprising means for entropy decoding the base layer and the enhancement layer separately.

38. The device of claim 36,
wherein the first information to be used to determine whether the N-bit enhancement layer video block was coded based on the base layer using inter-layer prediction comprises one bit of information per video block, and
wherein the second information to be used to determine whether the first inter-layer predictive coding technique or the second inter-layer predictive coding technique should be used comprises one bit of information per video block for which inter-layer prediction is used and for which the corresponding base layer video block is inter coded, wherein a combination of the second information and a determination of whether the N-bit enhancement layer video block corresponds to an intra base layer block or an inter base layer block identifies whether the first inter-layer predictive coding technique or the second inter-layer predictive coding technique was used.

39. A device that encodes video data according to a bit-depth-based scalable video coding (SVC) scheme, the device comprising:
a bitdepth-based scalable video encoder that generates a base layer and an enhancement layer associated with the video data, wherein the base layer defines the video data with bitdepths of M bits and the enhancement layer defines an enhancement of the bitdepths to N bits, wherein N is larger than M, and encodes the base layer and the enhancement layer, wherein for the enhancement layer the video encoder:
determines whether an N-bit enhancement layer video block should be coded based on the base layer using inter-layer prediction, and upon determining that the N-bit enhancement layer video block should be coded based on the base layer using inter-layer prediction:
determines whether an N-bit enhancement layer video block corresponds to an intra base layer block or an inter base layer block;
if the N-bit enhancement layer video block corresponds to an intra base layer block, encodes the N-bit enhancement layer video block according to a first inter-layer predictive coding technique, wherein the first inter-layer predictive coding technique includes generation of a residual video block as a difference between the N-bit enhancement layer video block and an upsampled N-bit version of a corresponding reconstructed M-bit base layer video block; and
if the N-bit enhancement layer video block corresponds to an inter base layer block, selects between the first inter-layer predictive coding technique and a second inter-layer predictive coding technique, wherein the second inter-layer predictive coding technique includes generation of the residual video block as a difference between the N-bit enhancement layer video block and an N-bit prediction block that is identified by a motion vector associated with a corresponding M-bit base layer video block; and
a wireless transmitter that transmits the base layer and the enhancement layer to another device.

40. The device of claim 39, wherein the device comprises a wireless communication handset.

41. A device that decodes video data according to a bit-depth-based scalable video coding (SVC) scheme, the device comprising:
a wireless receiver that receives the video data; and
a bitdepth-based scalable video decoder that receives a base layer and an enhancement layer associated with the video data, wherein the base layer defines the video data with bitdepths of M bits and the enhancement layer defines an enhancement of the bitdepths to N bits, wherein N is larger than M, and decodes the base layer and the enhancement layer, wherein for the enhancement layer, wherein the video decoder:
determines whether an N-bit enhancement layer video block was coded based on the base layer using inter-layer prediction, and upon determining that the N-bit enhancement layer video block was coded based on the base layer using inter-layer prediction:
determines whether an N-bit residual enhancement layer video block corresponds to an intra base layer block or an inter base layer block;
if the N-bit residual enhancement layer video block corresponds to an intra base layer block, decodes the N-bit residual enhancement layer video block according to a first inter-layer predictive coding technique, wherein the first inter-layer predictive coding technique includes generating a reconstructed video block as a sum of the N-bit residual enhancement layer video block and an upsampled N-bit version of a corresponding reconstructed M-bit base layer video block; and
if the N-bit residual enhancement layer video block corresponds to an inter base layer block, selects between the first inter-layer predictive coding technique and a second inter-layer predictive coding technique, wherein the second inter-layer predictive coding technique includes generating the reconstructed video block as a sum of the N-bit residual enhancement layer video block and an N-bit prediction block that is identified by a motion vector associated with a corresponding M-bit base layer video block.

42. The device of claim 41, wherein the device comprises a wireless communication handset.

* * * * *